US012760051B2

(12) United States Patent
Lutete et al.

(10) Patent No.: US 12,760,051 B2
(45) Date of Patent: Oct. 13, 2026

(54) METHOD FOR PRODUCING OPTICALLY ACTIVE COMPOUND

(71) Applicant: SUMITOMO CHEMICAL COMPANY, LIMITED, Chuo-ku (JP)

(72) Inventors: Leopold Mpaka Lutete, Takarazuka (JP); Koji Hagiya, Takarazuka (JP)

(73) Assignee: SUMITOMO CHEMICAL COMPANY, LIMITED, Chuo-ku (JP)

( * ) Notice: Subject to any disclaimer, the term of this patent is extended or adjusted under 35 U.S.C. 154(b) by 850 days.

(21) Appl. No.: 18/005,161

(22) PCT Filed: Jul. 6, 2021

(86) PCT No.: PCT/JP2021/025489

§ 371 (c)(1),
(2) Date: Jan. 11, 2023

(87) PCT Pub. No.: WO2022/014414

PCT Pub. Date: Jan. 20, 2022

(65) Prior Publication Data

US 2023/0257408 A1 Aug. 17, 2023

(30) Foreign Application Priority Data

Jul. 17, 2020 (JP) ................................ 2020-122762

(51) Int. Cl.
*C07F 15/06* (2006.01)

(52) U.S. Cl.
CPC ................................ *C07F 15/065* (2013.01)

(58) Field of Classification Search
CPC ................................ C07F 15/65
See application file for complete search history.

(56) References Cited

U.S. PATENT DOCUMENTS

| | | | | |
|---|---|---|---|---|
| 5,521,317 | A | 5/1996 | Briner | |
| 5,728,869 | A | 3/1998 | Briner | |
| 8,580,836 | B2 | 11/2013 | Matsuzaki et al. | |
| 9,227,911 | B2 * | 1/2016 | Ujita | C07C 51/412 |
| 9,796,678 | B2 | 10/2017 | Takahashi et al. | |
| 2017/0022162 | A1 * | 1/2017 | Takahashi | C07D 215/08 |
| 2021/0009521 | A1 | 1/2021 | Schotes et al. | |

FOREIGN PATENT DOCUMENTS

| | | | | |
|---|---|---|---|---|
| CN | 110655456 | A * | 1/2020 | C07C 17/354 |
| JP | 7-215921 | A | 8/1995 | |
| JP | 2012-25735 | A | 2/2012 | |
| JP | 2018-39757 | A | 3/2018 | |
| WO | WO 2013/086397 | A1 | 6/2013 | |
| WO | WO 2015/141564 | A1 | 9/2015 | |
| WO | WO-2017178868 | A1 * | 10/2017 | C07D 215/18 |
| WO | WO 2019/185541 | A1 | 10/2019 | |
| WO | WO 2022/014413 | A1 | 1/2022 | |

OTHER PUBLICATIONS

Guo "Synthesis, characterization and 1,3-butadiene polymerization studies of cobalt dichloride complexes bearing pyridine bisoxazoline ligands" Polymer 2015, 59, 124-132.*

Chen "Cobalt-Catalyzed Asymmetric Hydrogenation of 1,1-Diarylethenes." Org. Lett. 2016, 18, 1594-1597.*

Schuster, "Bench-Stable, Substrate-Activated Cobalt Carboxylate Pre-Catalysts for Alkene Hydrosilylation with Tertiary Silanes." ACS Catalysis, 2016, 6(4), 2632-2636.*

Alig "First-Row Transition Metal (De)Hydrogenation Catalysis Based on Functional Pincer Ligands" Chem. Rev. 2019, 119, 2681-2751.*

(Continued)

*Primary Examiner* — David K O'Dell

(74) *Attorney, Agent, or Firm* — Oblon, McClelland, Maier & Neustadt, L.L.P.

(57) ABSTRACT

An object of the present invention is to provide a further more effective process for preparing a certain optically active compound including an optically active 1-acetyl-2,2,4-trimethyl-1,2,3,4-tetrahydroquinoline.

The present invention provides a process for an optically active compound represented by formula (3) (wherein $R^5$ represents a hydrogen atom etc., $R^6$ and $R^7$ each independently represents a hydrogen atom, etc., $R^8$ represents a C1-C6 alkyl group, and $R^9$, $R^{10}$ and $R^{11}$ each independently represents a hydrogen atom, etc. The carbon atom with a symbol of the asterisked "*" represents an asymmetric carbon atom), which comprises a reacting a compound represented by formula (2) (wherein $R^5$, $R^6$, $R^7$, $R^8$, $R^9$, $R^{10}$, and $R^{11}$ has the same meanings as the above) with hydrogen in the presence of asymmetric cobalt complex.

(2)

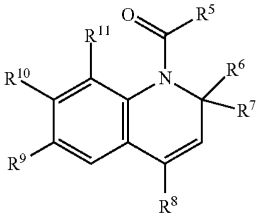

(3)

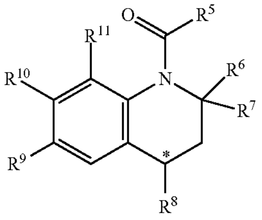

15 Claims, No Drawings

(56) References Cited

OTHER PUBLICATIONS

International Search Report issued Aug. 17, 2021, in PCT/JP2021/025489 (with English Translation), 3 pages.
English translation of International Preliminary Report on Patentability and Written Opinion issued Jan. 17, 2023. in PCT/JP2021/025489, 5 pages.
Guo, J. et al., "Highly Chemo-, Regio-, and Stereoselective Cobalt-Catalyzed Markovnikov Hydrosilylation of Alkynes", Angewandte Chemie, International Edition, 2016, vol. 55, No. 36, pp. 10835-10838, schemes 1, 2.
Zuo, Z. et al., "Cobalt-Catalyzed Alkyne Hydrosilylation and Sequential Vinylsilane Hydroboration with Markovnikov Selectivity", Angewandte Chemie. International Edition. 2016, vol. 55, No. 36, pp. 10839-10843, table 1.
Sebastien Monfette et al., "Enantiopure C1-Symmetric Bis(imino)pyridine Cobalt Complexes for Asymmetric Alkene Hydrogenation", Journal of the American Chemical Society, 2012, vol. 134, pp. 4561-4564.
Combined Chinese Office Action and Search Report issued Dec. 4, 2023 in Chinese Patent Application No. 202180049266.3 (with unedited computer-generated English translation), 23 pages.

* cited by examiner

METHOD FOR PRODUCING OPTICALLY ACTIVE COMPOUND

CROSS-REFERENCE TO RELATED APPLICATIONS

The present application is a 35 U.S.C. § 371 national stage patent application of International patent application PCT/JP2021/025489, filed on Jul. 6, 2021, which is based on and claims the benefits of priority to Japanese Application No. 2020-122762, filed on Jul. 17, 2020. The entire contents of these applications are incorporated herein by reference.

TECHNICAL FIELD

The present invention relates to a process for preparing an optically active compound and an asymmetric cobalt complex which is useful therefor.

BACKGROUND ART

Patent Document 1 describes as a process for preparing an optically active 1-acetyl-2,2,4-trimethyl-1,2,3,4-tetrahydroquinoline, a method of reacting a 1-acetyl-1,2-dihydro-2,2,4-trimethyl-1-quinoline with hydrogen in the presence of an asymmetric iridium catalyst.

CITATION LIST

Patent Document

Patent Document 1: WO 2015/141564

SUMMARY OF THE INVENTION

Problems to be Solved by Invention

An object of the present invention is to provide a further more effective process for preparing a certain optically active compound including an optically active 1-acetyl-2,2,4-trimethyl-1,2,3,4-tetrahydroquinoline.

Means to Solve Problems

Under such a situation, the present inventors have intensively studied to achieve the present invention. That is, the present invention includes the following embodiments.

[1]A process for preparing an optically active compound represented by formula (3):

(3)

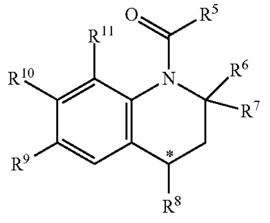

(wherein $R^5$ represents a hydrogen atom, or a C1-C6 alkyl group which may optionally have one or more substituents;

$R^6$ and $R^7$ each independently represents a hydrogen atom, or a C1-C6 alkyl group;

$R^8$ represents a C1-C6 alkyl group; and $R^9$, $R^{10}$ and $R^{11}$ each independently represents a hydrogen atom, a halogen atom, an amino group, a hydroxy group, a C1-C6 alkyl group which may optionally have one or more substituents, a C1-C6 alkoxy group which may optionally have one or more substituents, a C2-C7 alkylcarbonyl group which may optionally have one or more substituents, or a C6-C10 aryl group which may optionally have one or more substituents; and the carbon atom with a symbol of the asterisked "*" represents an asymmetric carbon atom), which comprises reacting a compound represented by formula (2):

(2)

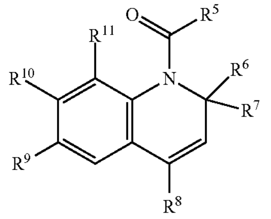

(wherein each of $R^5$, $R^6$, $R_7$, $R^8$, $R^9$, $R^{10}$, and $R^{11}$ has the same meanings as described above) with hydrogen in the presence of an asymmetric cobalt complex.

[2] The process according to [1] wherein the asymmetric cobalt complex described in [1] represents a monovalent cobalt complex which is obtained by reacting an asymmetric cobalt complex represented by formula (1):

(1)

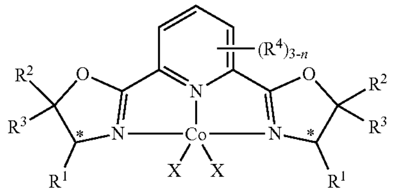

(wherein, $R^1$ each independently represents a C1-C10 alkyl group which may optionally have one or more substituents, a C3-C10 cycloalkyl group which may optionally have one or more substituents, or a C6-C10 aryl group which may optionally have one or more substituents;

$R^2$ and $R^3$ each independently represents a hydrogen atom, a C1-C10 alkyl group which may optionally have one or more substituents, or a C6-C10 aryl group which may optionally have one or more substituents, or alternatively $R^2$ and $R^3$ are combined with each other together with a carbon atom to which they are attached to form a cycle;

$R^4$ represents a C1-C10 alkyl group which may optionally have one or more substituents, a C1-C10 alkoxy group which may optionally have one or more substituents, a C1-C10 alkylthio group which may optionally have one or more substituents, a C2-C11 alkoxycarbonyl group which may optionally have one or more substituents, a C2-C11 alkylcarbonyl group which may optionally have one or more substituents, a C6-C10 aryl group which may optionally have one or more substituents, a halogen atom, an amino group which may be optionally mono- or di-alkylated with C1-C10 alkyl group, a nitro group, a hydroxy group, a sulfo group, a C1-C10 alkylsulfonyl group, a C6-C10 arylsulfonyl group, or a halosulfonyl group;

n is 0, 1, 2 or 3;

when n is 0 or 1, a plurality of $R^4$ may be identical to or different from each other;

X represents a chlorine atom, a bromine atom or an iodine atom; and the carbon atom with a symbol of the asterisked "*" represents an asymmetric carbon atom) with a reducing agent.

[3] The process according to [2] wherein the reducing agent represents a hydride reducing agent, and the monovalent cobalt complex represents a hydride complex.

[4] The process according to [3] wherein the hydride reducing agent represents a trialkyl borohydride alkali metal salt.

[5]A process according to [3] or [4] wherein the reaction is carried out further in the presence of a divalent halogenated cobalt salt.

[6] The process according to [5] wherein an amount used of the divalent halogenated cobalt salt per 1 mole of the hydride complex is within a range of 2 moles or less.

[7] The process according to [3] or [4] wherein the reaction is carried out further in the presence of trialkylamine.

[8] The process according to [7] wherein an amount used of the trialkylamine per 1 mole of the compound represented by formula (2) is within a range of 0.5 moles to 3 moles.

[9] The process according to [2] wherein the reducing agent represents an alkyl lithium, and the monovalent cobalt complex represents an alkyl complex.

[10]A process for preparing an optically active compound, which comprises a step of reacting the optically active compound represented by formula (3) which is obtained in the process according to any one of [1] to [9] with an acid to obtain an optically active compound represented by formula (4):

(4)

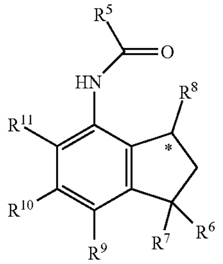

(wherein each of $R^5$, $R^6$, $R^7$, $R^8$, $R^9$, $R^{10}$, and $R^{11}$ has the same meanings as described above; and the carbon atom with a symbol of the asterisked "*" represents an asymmetric carbon atom); and further a step of reacting the obtained optically active compound represented by formula (4) with water to obtain a compound represented by formula (5):

(5)

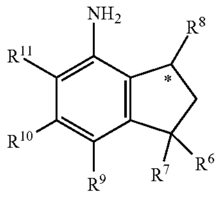

(wherein each of $R^6$, $R^7$, $R^8$, $R^9$, $R^{10}$, and $R^{11}$ has the same meanings as described above; and the carbon atom with a symbol of the asterisked "*" represents an asymmetric carbon atom).

[11] The process according to [10] wherein $R^6$, $R^7$ and $R^8$ in the formula (5) represents a methyl group; and $R^9$, $R^{10}$ and $R^{11}$ represents a hydrogen atom.

[12]A process for preparing an optically active 1,1,3-trimethyl-4-aminoindane, which comprises a step that after the optically active compound represented by formula (5) obtained in [11] is dissolved in a solvent, an optical resolution is carried out using the optically active tartaric acid.

[13]A process for preparing an optically active 1,1,3-trimethyl-4-aminoindane, which comprises a step that after the optically active compound represented by formula (5) obtained in [11] is dissolved in a solvent, a preferential crystallization is carried out by adding an acid.

[14] The process according to [13] wherein an acid dissociation constant (pKa) of the acid is less than 2.8.

[15] The process according to any one of [12] to [14] wherein an enantiomeric ratio of the optically active compound represented by formula (5) is 70/30 or more as R-isomer/S-isomer.

[16]A process for preparing an optically active compound, which comprises further a step of reacting the optically active 1,1,3-trimethyl-4-aminoindane which is obtained by the process according to any one of [12] to [15] with a compound represented by formula (6):

(6)

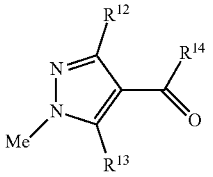

(wherein $R^{12}$ and $R^{13}$ each independently represents a C1-C6 alkyl group which may be optionally substituted with one or more halogen atoms, or a hydrogen atom; and $R^{14}$ represents a halogen atom, a hydroxy group, or a C1-C6 alkoxy group which may be optionally substituted with one or more halogen atoms) to obtain a compound represented by formula (7):

(7)

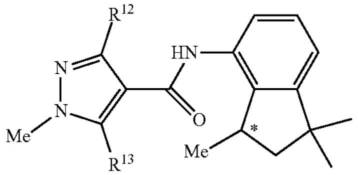

(wherein each of $R^{12}$, $R^{13}$ and a symbol of the asterisked "*" has the same meanings as described above).

[17] An asymmetric cobalt complex represented by formula (1')

(1')

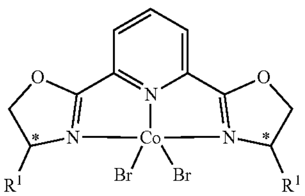

(wherein
$R^1$ represents an isopropyl group or a tert-butyl group; and a symbol of the asterisked "*" represents an asymmetric carbon atom).

[18]A hydride complex which is obtained by reacting an asymmetric cobalt complex represented by formula (1'):

(1')

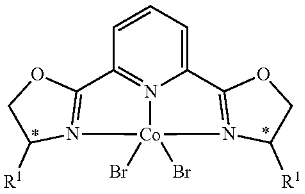

(wherein
$R^1$ represents an isopropyl group or a tert-butyl group; and a symbol of the asterisked "*" represents an asymmetric carbon atom)
with a hydride reducing agent.

[19] An alkyl complex which is obtained by reacting an asymmetric cobalt complex represented by formula (1'):

(1')

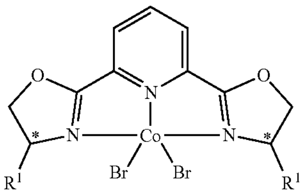

(wherein
$R^1$ represents an isopropyl group or a tert-butyl group; and a symbol of the asterisked "*" represents an asymmetric carbon atom)
with an alkyl lithium.

Effect of Invention

The present invention can produce an optically active compound represented by the above formula (3) effectively. Also, the obtained optically active compound represented by formula (3) is reacted with an acid, followed by reacting with water to produce an optically active compound represented by the above formula (5) effectively. Further, the optically active 1,1,3-trimethyl-4-aminoindane, which is one of the obtained optically active compound represented by formula (5), is subjected to an optical resolution or a preferential crystallization using an acid to produce the 1,1,3-trimethyl-4-aminoindane having high optical purity effectively, and the obtained 1,1,3-trimethyl-4-aminoindane having a high optical purity is reacted with the compound represented by the above formula (6) to produce the optically active compound represented by the above formula (7) effectively. The optically active compound represented by formula (7) has been known to have an efficacy on controlling plant diseases (see WO 2011/162397 A1).

MODE FOR CARRYING OUT THE INVENTION

Hereinafter, the present invention is explained in more detail.

The expression of "CX—CY" as used herein represents that the number of carbon atom is from X to Y. For example, the expression of "C1-C4" represents that the number of carbon atom is from 1 to 4.

Example of the term of "C1-C10 alkyl group" as used herein include a methyl group, an ethyl group, a propyl group, an isopropyl group, a butyl group, an isobutyl group, a sec-butyl group, a tert-butyl group, a pentyl group, a hexyl group, a heptyl group, an octyl group, a nonyl group, a decyl group, and the others.

Examples of the substituent which may be optionally contained by these C1-C10 alkyl group includes a C6-C10 aryl group which may optionally have one or more C1-C10 alkyl group or C1-C10 alkoxy group (such as phenyl group, naphthyl group, 4-methylphenyl group, 4-methoxyphenyl group and the like); a C1-C10 alkoxy group which may optionally have one or more fluorine atoms (such as methoxy group, ethoxy group, propoxy group, isopropoxy group, butoxy group, isobutoxy group, sec-butyloxy group, tert-butoxy group, trifluoromethoxy group, and the like); a C1-C10 alkoxy group which has a C6-C10 aryl group wherein the C6-C10 aryl group may optionally have one or more C1-C10 alkyl group or one or more C1-C10 alkoxy group (such as benzyloxy group, 4-methylbenzyloxy group, 4-methoxybenzyloxy group, and the like); a C1-C10 alkoxy group which has a C6-C10 aryl group wherein the C6-C10 aryl group has one or more C6-C10 aryloxy group (such as 3-phenoxybenzyloxy group and the like); a C6-C10 aryloxy group which may optionally have one or more C1-C10 alkyl group or one or more C1-C10 alkoxy group (such as phenoxy group, 2-methylphenoxy group, 4-methylphenoxy group, 4-methoxyphenoxy group, and the like); a C6-C10 aryloxy group which has one or more C6-C10 aryloxy group (such as 3-phenoxyphenoxy group and the like); a C2-C10 acyl group which may optionally have one or more C6-C10 aryl group wherein the C6-C10 aryl group may optionally have one or more C1-C10 alkyl group or one or more C1-C10 alkoxy group (such as acetyl group, propionyl group, benzylcarbonyl group, 4-methylbenzylcarbonyl group, 4-methoxybenzylcarbonyl group, benzoyl group, 2-methylbenzoyl group, 4-methylbenzoyl group, 4-methoxybenzoyl group and the like); a carboxy group; as well as a fluorine atom.

Examples of the C1-C10 alkyl group having one or more substituents include a fluoromethyl group, a trifluoromethyl group, a methoxymethyl group, an ethoxymethyl group, a methoxyethyl group, a benzyl group, a 4-fluorobenzyl group, a 4-methylbenzyl group, a phenoxymethyl group, a 2-oxopropyl group, a 2-oxobutyl group, a phenacyl group, and a 2-carboxyethyl group.

Examples of the C3-C10 cycloalkyl group as used herein include a cyclopropyl group, a 2,2-dimethylcyclopropyl group, a cyclopentyl group, a cyclohexyl group, a menthyl group, and the like.

Examples of the substituent which may be optionally contained by these C3-C10 cycloalkyl group include a C6-C10 aryl group which may optionally have one or more C1-C10 alkyl group or one or more C1-C10 alkoxy group (such as phenyl group, naphthyl group, 4-methylphenyl group, 4-methoxyphenyl group and the like); a C1-C10 alkoxy group which may optionally have one or more fluorine atoms (such as methoxy group, ethoxy group, propoxy group, isopropoxy group, butoxy group, isobutoxy group, sec-butyloxy group, tert-butoxy group, trifluoromethoxy group and the like); a C1-C10 alkoxy group which has C6-C10 aryl group wherein the C6-C10 aryl group may optionally have one or more C1-C10 alkyl group or one or more C1-C10 alkoxy group (such as benzyloxy group, 4-methylbenzyloxy group, 4-methoxybenzyloxy group and the like); a C1-C10 alkoxy group having C6-C10 aryl group wherein the C6-C10 aryl group has one or more C6-C10 aryloxy group (such as 3-phenoxybenzyoxy group and the like); a C6-C10 aryloxy group which may optionally have one or more C1-C10 alkyl group or one or more C1-C10 alkoxy group (such as phenoxy group, 2-methylphenoxy group, 4-methylphenoxy group, 4-methoxyphenoxy group, and the like); a C6-C10 aryloxy group which has one or more C6-C10 aryloxy group (such as 3-phenoxyphenoxy group and the like); a C2-C10 acyl group which may optionally have C6-C10 aryl group wherein the C6-C10 aryl group may optionally have one or more C1-C10 alkyl group or one or more C1-C10 alkoxy group (such as acetyl group, propionyl group, benzylcarbonyl group, 4-methylbenzylcarbonyl group, 4-methoxybenzylcarbonyl group, benzoyl group, 2-methylbenzoyl group, 4-methylbenzoyl group, 4-methoxybenzoyl group and the like); a carboxy group; as well as a fluorine atom.

Examples of the C3-C10 cycloalkyl group having any substituents include a fluorocyclopropyl group, a 4-trifluorocyclohexyl group, a 4-methoxycyclopentyl group, a 4-phenylcyclohexyl group.

Examples of the C6-C10 aryl group as used herein include a phenyl group and a naphthyl group.

Examples of the substituent which may be optionally contained by these C6-C10 aryl group include a C1-C10 alkyl group which may optionally have one or more C1-C10 alkoxy group or one or more fluorine atoms (such as methyl group, fluoromethyl group, trifluoromethyl group, methoxymethyl group, ethoxymethyl group, methoxyethyl group and the like); a C1-C10 alkoxy group which may optionally have one or more C1-C10 alkoxy group or one or more fluorine atoms (such as methoxy group, ethoxy group, propoxy group, isopropoxy group, butoxy group, isobutyloxy group, sec-butyloxy group, tert-butyloxy group, pentyloxy group, fluoromethoxy group, trifluoromethoxy group, methoxymethoxy group, ethoxymethoxy group, methoxyethoxy group and the like); a C3-C10 cycloalkyloxy group (such as cyclopentyloxy group and the like); as well as a halogen atom (such as fluorine atom, chlorine atom and the like).

Examples of the C6-C10 aryl group having one or more substituents include a 2-methylphenyl group, a 4-methylphenyl group, a 4-chlorophenyl group, and a 4-methoxyphenyl group.

The term of "C1-C10 alkoxy group which may optionally have one or more substituents" as used herein represents a group wherein a hydrogen atom composed of a hydroxy group (—OH) is replaced by the above-mentioned C1-C10 alkyl group which may optionally have one or more substituents, and includes, for example, a methoxy group, an ethoxy group, a n-propoxy group, a n-butoxy group, a sec-butoxy group, a pentyloxy group, a decyloxy group, a fluoromethoxy group, a trifluoromethoxy group, a methoxymethoxy group, an ethoxymethoxy group, a benzyloxy group, a 4-fluorobenzyloxy group, a 4-methylbenzyloxy group, a phenoxymethoxy group, a 2-oxopropoxy group, and a 2-oxobutoxy group.

The term of "C1-C10 alkylthio group which may optionally have one or more substituents" as used herein represents a group wherein a hydrogen atom composed of a sulphanyl group (—SH) is replaced by the above-mentioned C1-C10 alkyl group which may optionally have one or more substituents, and includes, for example, a methylthio group, an ethylthio group, a n-propyltho group, a n-butylthio group, a sec-butylthio group, a pentylthio group, a thidecylthio group, a fluoromethylthio group, a trifluoromethylthio group, a methoxymethylthio group, an ethoxymethylthio group, a benzylthio group, a 4-fluorobenzylthio group, a 4-methylbenzylthio group, a phenoxymethylthio group, a 2-oxopropylthio group, and a 2-oxobutylthio group.

The term of "C2-C11 alkoxycarbonyl group which may optionally have one or more substituents" as used herein represents a group wherein a hydrogen atom composed of formyl group (—CHO) is replaced by the above-mentioned C1-C10 alkoxy group which may optionally have one or more substituents, and includes, for example, a methoxycarbonyl group, an ethoxycarbonyl group, a n-propoxycarbonyl group, a n-butoxycarbonyl group, a sec-butoxycarbonyl group, a tert-butoxycarbonyl group, a pentyloxycarbonyl group, a decyoxycarbonyl group, a fluoromethoxycarbonyl group, a trifluoromethoxycarbonyl group, a methoxymethoxycarbonyl group, an ethoxymethoxycarbonyl group, a benzyloxycarbonyl group, a 4-fluorobenzyloxycarbonyl group, a 4-methylbenzyloxycarbonyl group, a phenoxymethoxycarbonyl group, a 2-oxopropoxycarbonyl group, and a 2-oxobutoxycarbonyl group.

The term of "C2-C11 alkylcarbonyl group which may optionally have one or more substituents" as used herein represents a group wherein the hydrogen atom composed of formyl group (—CHO) is replaced by the above-mentioned C1-C10 alkyl group which may be optionally substituted with any substituents, and includes, for example, an acetyl group, an ethylcarbonyl group, a propylcarbonyl group, a butylcarbonyl group, a sec-butylcarbonyl group, a tert-butylcarbonyl group, a pentylcarbonyl group, a decylcarbonyl group, a fluoromethylcarbonyl group, a trifluoromethylcarbonyl group, a methoxymethylcarbonyl group, an ethoxymethylcarbonyl group, a benzylcarbonyl group, a 4-fluorobenzylcarbonyl group, a 4-methylbenzylcarbonyl group, a phenoxymethylcarbonyl group, a 2-oxopropylcarbonyl group, and a 2-oxobutylcarbonyl group.

The term of "amino group which is mono- or di-alkylated" as used herein represents a group wherein at least one of two hydrogen atoms composed of amino group (—$NH_2$)

is replaced by the above-mentioned C1-C10 alkyl group, and includes, for example, a methylamino group, a dimethylamino group, an ethylamino group, and a diethylamino group.

The term of "C1-C10 alkylsulfonyl group" as used herein represents a group wherein a OH group composed of a sulfo group (—$SO_2$OH) is replaced by the above-mentioned C1-C10 alkyl group, and includes, for example, a methylsulfonyl group and an ethylsulfonyl group.

The term of "C6-C10 arylsulfonyl group" as used herein represents a group wherein a OH group composed of a sulfo group (—$SO_2$OH) is replaced by the above-mentioned C6-C10 aryl group, and includes, for example, a phenylsulfonyl group, and a 4-methylphenylsulfonyl group.

The term of "halosulfonyl group" as used herein represents a group wherein a OH group composed of a sulfo group (—$SO_2$OH) is replaced by halogen atom, and includes, for example, a fluorosulfonyl group and a chlorosulfonyl group.

Examples of the halogen atom include a fluorine atom, a chlorine atom, a bromine atom, and an iodine atom.

Next, a process for preparing the optically active compound represented by the above-mentioned formula (3) (hereinafter, sometimes referred to as "optically active compound (3)"), which comprises reacting the above-mentioned compound represented by formula (2) (hereinafter, sometimes referred to as "optically active compound (2)") with hydrogen in the presence of an asymmetric cobalt complex.

The asymmetric cobalt complex as used herein may be any complex wherein an optically active ligand is coordinated with a cobalt metal or a cobalt ion, and may use the asymmetric cobalt complex described in, for example, J. Amer. Chem. Soc., 2012, vol. 134, pages 4561-4564, or the above-mentioned complex represented by formula (1) (hereinafter, sometimes referred to as "complex (1)"), and preferably uses a complex which is obtained by reacting the complex (1) with a reducing agent (hereinafter, sometimes referred to as "monovalent cobalt complex (1)").

In the above formula (1), examples of the cycle which $R^2$ and $R^3$ are combined with each other together with a carbon atom to which they are attached to form include a cycloalkane cycle such as cyclopentane cycle, cyclohexane cycle, and cycloheptane cycle. These cycles may be substituted with the above-mentioned C1-C10 group which may optionally have one or more substituents or the above-mentioned any substituents which may be optionally contained by the C1-C10 alkyl group.

In the above formula (1), $R^1$ represents preferably a C1-C10 alkyl group which may optionally have one or more substituents, and more preferably a C1-C4 alkyl group which may optionally have one or more substituents.

$R^2$ and $R^3$ each independently represents preferably a hydrogen atom or C1-C4 alkyl group.

$R^4$ represents preferably a C1-C4 alkoxy group or a halogen atom.

n is preferably 2 or 3, and is more preferably 3.

X represents preferably a chlorine atom or a bromine atom.

$R^1$, $R^2$, $R^3$ and X are preferably defined by any combinations thereof.

Examples of the complex (1) include the followings:

dichloro[2,6-bis[4-(S)-isopropyl-2-oxazolinyl]pyridine]cobalt,
dichloro[2,6-bis[4-(R)-isopropyl-2-oxazolinyl]pyridine]cobalt,
dibromo[2,6-bis[4-(S)-isopropyl-2-oxazolinyl]pyridine]cobalt,
dibromo[2,6-bis[4-(R)-isopropyl-2-oxazolinyl]pyridine]cobalt,
diiodo[2,6-bis[4-(S)-isopropyl-2-oxazolinyl]pyridine]cobalt,
diiodo[2,6-bis[4-(R)-isopropyl-2-oxazolinyl]pyridine]cobalt,
dichloro[2,6-bis[4-(S)-tert-butyl-2-oxazolinyl]pyridine]cobalt,
dichloro[2,6-bis[4-(R)-tert-butyl-2-oxazolinyl]pyridine]cobalt,
dibromo[2,6-bis[4-(S)-tert-butyl-2-oxazolinyl]pyridine]cobalt,
dibromo[2,6-bis[4-(R)-tert-butyl-2-oxazolinyl]pyridine]cobalt,
diiodo[2,6-bis[4-(S)-tert-butyl-2-oxazolinyl]pyridine]cobalt,
diiodo[2,6-bis[4-(R)-tert-butyl-2-oxazolinyl]pyridine]cobalt,
dichloro[2,6-bis[4-(S)-ethyl-2-oxazolinyl]pyridine]cobalt,
dichloro[2,6-bis[4-(R)-ethyl-2-oxazolinyl]pyridine]cobalt,
dibromo[2,6-bis[4-(S)-ethyl-2-oxazolinyl]pyridine]cobalt,
dibromo[2,6-bis[4-(R)-ethyl-2-oxazolinyl]pyridine]cobalt,
diiodo[2,6-bis[4-(S)-ethyl-2-oxazolinyl]pyridine]cobalt,
diiodo[2,6-bis[4-(R)-ethyl-2-oxazolinyl]pyridine]cobalt,
dichloro[2,6-bis[4-(S)-methyl-2-oxazolinyl]pyridine]cobalt,
dichloro[2,6-bis[4-(R)-methyl-2-oxazolinyl]pyridine]cobalt,
dibromo[2,6-bis[4-(S)-methyl-2-oxazolinyl]pyridine]cobalt,
dibromo[2,6-bis[4-(R)-methyl-2-oxazolinyl]pyridine]cobalt,
diiodo[2,6-bis[4-(S)-methyl-2-oxazolinyl]pyridine]cobalt,
diiodo[2,6-bis[4-(R)-methyl-2-oxazolinyl]pyridine]cobalt,
dichloro[2,6-bis[4-(S)-phenyl-2-oxazolinyl]pyridine]cobalt,
dichloro[2,6-bis[4-(R)-phenyl-2-oxazolinyl]pyridine]cobalt,
dibromo[2,6-bis[4-(S)-phenyl-2-oxazolinyl]pyridine]cobalt,
dibromo[2,6-bis[4-(R)-phenyl-2-oxazolinyl]pyridine]cobalt,
diiodo[2,6-bis[4-(S)-phenyl-2-oxazolinyl]pyridine]cobalt,
diiodo[2,6-bis[4-(R)-phenyl-2-oxazolinyl]pyridine]cobalt,
dichloro[2,6-bis[4-(S)-naphthyl-2-oxazolinyl]pyridine]cobalt,
dichloro[2,6-bis[4-(R)-naphthyl-2-oxazolinyl]pyridine]cobalt,
dibromo[2,6-bis[4-(S)-naphthyl-2-oxazolinyl]pyridine]cobalt,
dibromo[2,6-bis[4-(R)-naphthyl-2-oxazolinyl]pyridine]cobalt,
diiodo[2,6-bis[4-(S)-naphthyl-2-oxazolinyl]pyridine]cobalt,
diiodo[2,6-bis[4-(R)-naphthyl-2-oxazolinyl]pyridine]cobalt,
dichloro[2,6-bis[4-(S)-isopropyl-2-oxazolinyl]chloropyridine]cobalt,
dichloro[2,6-bis[4-(R)-isopropyl-2-oxazolinyl]chloropyridine]cobalt,
dibromo[2,6-bis[4-(S)-isopropyl-2-oxazolinyl]chloropyridine]cobalt,
dibromo[2,6-bis[4-(R)-isopropyl-2-oxazolinyl]chloropyridine]cobalt,
diiodo[2,6-bis[4-(S)-isopropyl-2-oxazolinyl]chloropyridine]cobalt,
diiodo[2,6-bis[4-(R)-isopropyl-2-oxazolinyl]chloropyridine]cobalt, dichloro[2,6-bis[4-(S)-tert-butyl-2-oxazolinyl]chloropyridine]cobalt,
dichloro[2,6-bis[4-(R)-tert-butyl-2-oxazolinyl]chloropyridine]cobalt,
dibromo[2,6-bis[4-(S)-tert-butyl-2-oxazolinyl]chloropyridine]cobalt,
dibromo[2,6-bis[4-(R)-tert-butyl-2-oxazolinyl]chloropyridine]cobalt,
diiodo[2,6-bis[4-(S)-tert-butyl-2-oxazolinyl]chloropyridine]cobalt,
diiodo[2,6-bis[4-(R)-tert-butyl-2-oxazolinyl]chloropyridine]cobalt,
dichloro[2,6-bis[4-(S)-tert-butyl-2-oxazolinyl]-4-methoxypyridine]cobalt,
dichloro[2,6-bis[4-(R)-tert-butyl-2-oxazolinyl]-4-methoxypyridine]cobalt,
dibromo[2,6-bis[4-(S)-tert-butyl-2-oxazolinyl]-4-methoxypyridine]cobalt,
dibromo[2,6-bis[4-(R)-tert-butyl-2-oxazolinyl]-4-methoxypyridine]cobalt,
diiodo[2,6-bis[4-(S)-tert-butyl-2-oxazolinyl]-4-methoxypyridine]cobalt,
diiodo[2,6-bis[4-(R)-tert-butyl-2-oxazolinyl]-4-methoxypyridine]cobalt,
dichloro[2,6-bis[4-(S)-isopropyl-2-oxazolinyl]-4-trifluoromethylpyridine]cobalt,
dichloro[2,6-bis[4-(R)-isopropyl-2-oxazolinyl]-4-nitropyridine]cobalt,
dibromo[2,6-bis[4-(S)-isopropyl-2-oxazolinyl]-4-trifluoromethylpyridine]cobalt,
dibromo[2,6-bis[4-(R)-isopropyl-2-oxazolinyl]-4-nitropyridine]cobalt,
diiodo[2,6-bis[4-(R)-isopropyl-2-oxazolinyl]-4-nitropyridine]cobalt,
diiodo[2,6-bis[4-(S)-isopropyl-2-oxazolinyl]-4-trifluoromethylpyridine]cobalt,
dichloro[2,6-bis[4-(S)-tert-butyl-2-oxazolinyl]-4-nitropyridine]cobalt,
dichloro[2,6-bis[4-(R)-tert-butyl-2-oxazolinyl]-4-trifluoromethylpyridine]cobalt,
dibromo[2,6-bis[4-(S)-tert-butyl-2-oxazolinyl]-4-nitropyridine]cobalt,
dibromo[2,6-bis[4-(R)-tert-butyl-2-oxazolinyl]-4-trifluoromethylpyridine]cobalt,
diiodo[2,6-bis[4-(S)-tert-butyl-2-oxazolinyl]-4-nitropyridine]cobalt,
diiodo[2,6-bis[4-(R)-tert-butyl-2-oxazolinyl]-4-trifluoromethylpyridine]cobalt,
dichloro[2,6-bis[4-(S)-isopropyl-2-oxazolinyl]-4-hydroxypyridine]cobalt,
dichloro[2,6-bis[4-(R)-isopropyl-2-oxazolinyl]-4-methylpyridine]cobalt,
dibromo[2,6-bis[4-(S)-isopropyl-2-oxazolinyl]-4-phenylmethylpyridine]cobalt,
dibromo[2,6-bis[4-(R)-isopropyl-2-oxazolinyl]-4-methoxypyridine]cobalt,
diido[2,6-bis[4-(S)-isopropyl-2-oxazolinyl]-4-carbomethoxypyridine]cobalt,
diido[2,6-bis[4-(R)-isopropyl-2-oxazolinyl]-4-acetylmethylpyridine]cobalt,
dichloro[2,6-bis[4-(S)-tert-butyl-2-oxazolinyl]-4-dimethylaminopyridine]cobalt,
dichloro[2,6-bis[4-(R)-tert-butyl-2-oxazolinyl]-4-methylsulfonylpyridine]cobalt,
dibromo[2,6-bis[4-(S)-tert-butyl-2-oxazolinyl]-4-hydroxypyridine]cobalt,
dibromo[2,6-bis[4-(R)-tert-butyl-2-oxazolinyl]-4-bromopyridine]cobalt,
diiodo[2,6-bis[4-(S)-tert-butyl-2-oxazolinyl]-2-chloropyridine]cobalt,
diiodo[2,6-bis[4-(R)-tert-butyl-2-oxazolinyl]-2-fluoropyridine]cobalt,
dichloro[2,6-bis[4-(S)-tert-butyl-5,5-dimethyl-2-oxazolinyl]pyridine]cobalt,
dichloro[2,6-bis[4-(R)-tert-butyl-5,5-dimethyl-2-oxazolinyl]pyridine]cobalt,
dibromo[2,6-bis[4-(S)-tert-butyl-5,5-diphenyl-2-oxazolinyl]pyridine]cobalt, and
dibromo[2,6-bis[4-(R)-tert-butyl-5,5-diphenyl-2-oxazolinyl]pyridine]cobalt.

The complex (1) can be synthesized by mixing an optically active bisoxazolinyl pyridine derivative as a precursor with a divalent halogenated cobalt in a solvent according to the method described in, for example, Experiment items etc. in the supplementary materials of Angew. Chem. Int. Ed., vol. 55, p. 10839 (2016).

The optically active bisoxazolynyl pyridine derivative as a precursor can be prepared according to the method described in, for example, Scheme 1 etc. of Tetrahedron Letters, vol. 45, p. 8988 (2004). That is, the 2,6-dicarboxy pyridine derivative is reacted with thionyl chloride to convert into the corresponding carboxylic acid chloride, and the resulting carboxylic acid chloride is reacted with an optically active amino alcohol to convert into the corresponding diamide, and the resulting diamide is reacted with thionyl chloride to chlorinate a hydroxy group, and a ring close reaction to an oxazoline ring is then carried out in NaOH/methanol to prepare an optically active bisoxazolynyl pyridine derivative.

Among the complex (1), the asymmetric cobalt complex represented by the above-mentioned formula (1') (hereinafter, sometimes referred to as "complex (1')") is preferably included. In the above formula (1'), $R^1$ represents preferably a tert-butyl group. An optically active compound (3) with preferentially a higher ratio of the R-isomer can be usually obtained by performing the asymmetric hydrogenation reaction of the present invention using a monovalent cobalt complex which is obtained by a reduction reaction of the S-isomer of the complex (1'). The above-mentioned optically active compound represented by formula (7) is known that the R-isomer has a higher efficacy on controlling plant diseases than those of the S-isomer (see WO 2011/162397 A1). In view of obtaining the optically active compound (3) as an intermediate compound used in the process for preparing the above-mentioned optically active compound represented by formula (7), the complex (1') is preferably the S-isomer thereof. Hereinafter, the complex which is obtained by reacting the complex (1') with a reducing agent is sometimes described as "monovalent cobalt complex (1')".

When the compounds represented by formula (3), formula (4), formula (5), and formula (7) respectively is referred to as "optically active compound" herein, it is intended to mean any forms including a form of mixture of the R-isomer and the S-isomer thereof in which either of the R-isomer or the S-isomer is enantio-riched in the mixture form, or each form of the R-isomer or the S-isomer as itself, as described below, unless particularly is stated.

An optically active bisoxazolynyl pyridine ligand is obtained according to the above-mentioned method described in Scheme 1 (wherein R represents an isopropyl group or a tert-butyl group) in Tetrahedron Letters, vol. 45, p. 8988 (2004) to obtain an optically active bisoxazolynyl pyridine ligand, and the resulting ligand is mixed with a divalent brominated cobalt in place of a divalent chlorinated cobalt according to the method described in Experimental items of Supplementary material of Angew. Chem. Int. Ed., vol. 55, p. 10839 (2016).

Examples of the reducing agent to be reacted with the complex (1) include a hydride reducing agent, an alkyl lithium compound, and a Grignard reagent. The hydride reducing agent is preferably included.

The hydride reducing agent may be a reducing agent which can reduce the divalent cobalt atom of the complex (1) to produce a hydride complex containing monovalent cobalt atom, and examples thereof include trialkyl borohydride alkali metal salts such as a triethyl lithium borohydride, a triethyl sodium borohydride, a triethyl potassium borohydride, a trimethyl lithium borohydride, a trimethyl sodium borohydride, a tripropyl lithium borohydride, a tripropyl sodium borohydride, a tributyl lithium borohydride, and a tributyl sodium borohydride.

The amount used of the hydride reducing agent is within a range of usually 2 moles to 20 moles, preferably 4 moles to 10 moles, per 1 mole of the complex (1).

The reaction is carried out by mixing the complex (1) with a hydride reducing agent in an inactive solvent for the hydride reducing agent under an inert gas atmosphere to the hydride reducing agent. Also the reaction may be carried out in the presence of the compound (2). Examples of the solvent include ether solvents (such as diethyl ether, tetrahydrofuran, methyl tetrahydrofuran, 1,4-dioxane, and methyl tert-butyl ether); aliphatic hydrocarbon solvents (such as n-hexane, n-heptane, and cyclohexane; aromatic hydrocarbon solvents such as toluene, xylene, and chlorobenzene); as well as halogenated hydrocarbons solvents (such as dichloromethane and dichloroethane), and the ether solvent is preferably included.

The amount used of the solvent is within a range of usually 2 parts by weight to 100 parts by weight, per 1 part by weight of the complex (1).

The reaction temperature is usually within a range of −70° C. to 100° C.

The reaction period of the reaction is usually within a range of 10 minutes to 4 hours.

After the completion of the reaction, the obtained hydride complex may be isolated, however, it is usually used in the reaction of the compound (2) with hydrogen without an isolation.

The alkyl lithium compound may be a reducing agent which can reduce the divalent cobalt atom of the complex (1) to produce an alkyl complex containing a monovalent cobalt atom, and examples thereof include a methyl lithium, an ethyl lithium, a n-propyl lithium, and a n-butyl lithium.

The amount used of the alkyl lithium compound is within a range of usually 2 moles to 20 moles, preferably 3 moles to 10 moles, per 1 mole of the complex (1).

The reaction is carried out by mixing the complex (1) with an alkyl lithium compound in an inactive solvent to the alkyl lithium compound under an inert gas atmosphere. Also the reaction may be carried out in the presence of the compound (2).

Examples of the solvent include ether solvents (such as diethyl ether, tetrahydrofuran, methyl tetrahydrofuran, 1,4-dioxane, and methyl tert-butyl ether); aliphatic hydrocarbon solvents (such as n-hexane, n-heptane, and cyclohexane); aromatic hydrocarbon solvents (such as toluene, xylene, and chlorobenzene); as well as halogenated hydrocarbons solvents (such as dichloromethane and dichloroethane), and the ether solvents are preferably included.

The amount used of the solvent is within a range of usually 2 parts by weight to 100 parts by weight, per 1 part by weight of the complex (1).

The reaction temperature is usually within a range of −70° C. to 100° C.

The reaction period of the reaction is usually within a range of 10 minutes to 4 hours.

After the completion of the reaction, the obtained alkyl complex may be isolated, however, it is used in the reaction with the compound (2) with hydrogen without an isolation.

The Grignard reagent may be a reducing agent which can reduce the divalent cobalt atom of the complex (1) to produce an alkyl complex containing a monovalent cobalt atom, and examples thereof include a methyl magnesium bromide, an ethyl magnesium bromide, a n-propyl magnesium bromide, and a n-butyl magnesium bromide.

The amount used of the Grignard reagent is within a range of usually 2 moles to 20 moles, preferably 3 moles to 10 moles, per 1 mole of the complex (1).

The reaction is carried out by mixing the complex (1) with a Grignard reagent in an inactive solvent to the Grignard reagent under an inert gas atmosphere. Also the reaction may be carried out in the presence of the compound (2).

Examples of the solvent include ether solvents (such as diethyl ether, tetrahydrofuran, methyltetrahydrofuran, 1,4-dioxane, and methyl tert-butyl ether); aliphatic hydrocarbon solvents (such as n-hexane, n-heptane, and cyclohexane); aromatic hydrocarbon solvents (such as toluene, xylene, and chlorobenzene); as well as halogenated hydrocarbons solvents (such as dichloromethane and dichloroethane), and the ether solvents are preferably included.

The amount used of the solvent is within a range of usually 2 parts by weight to 100 parts by weight, per 1 part by weight of the complex (1).

The reaction temperature is usually within a range of −70° C. to 100° C.

The reaction period of the reaction is usually within a range of 10 minutes to 4 hours.

After the completion of the reaction, the obtained alkyl complex may be isolated, however, it is used in the reaction of the compound (2) with hydrogen without an isolation.

The compound (2) can be synthesized according to the method described in, for example, J. Chem. Soc. (C), 1966, p. 514. Alternatively, a commercial available product may be used.

Examples of the compound (2) include 1-acetyl-1,2-dihydro-2,2,4-trimethyl-1-quinoline, 1-acetyl-1,2-dihydro-2,2,4-trimethyl-6-fluoro-1-quinoline, 1-acetyl-1,2-dihydro-2,2,4-trimethyl-6-ethoxy-1-quinoline, 1-acetyl-2,2-dimethyl-4-ethyl-1-quinoline, 1-acetyl-1,2-dihydro-2,2-dimethyl-4-propyl-1-quinoline, 1-acetyl-1,2-dihydro-2,2-dimethyl-4-butyl-1-quinoline, 1-acetyl-1,2-dihydro-2,2-diethyl-4-methyl-1-quinoline, 1-acetyl-1,2-dihydro-2,2-dipropyl-4-methyl-1-quinoline, 1-ethylcarbonyl-1,2-dihydro-2,2,2-trimethyl-1-quinoline, 1-ethylcarbonyl-1,2-dihydro-2,2-dimethyl-4-ethyl-1-quinoline, 1-ethylcarbonyl-1,2-dihydro-2,2-dimethyl-4-propyl-1-quinoline, 1-ethylcarbonyl-1,2-dihydro-2,2-dimethyl-4-butyl-1-quinoline, 1-ethylcarbonyl-1,2-dihydro-2,2-diethyl-4-methyl-1-quinoline, 1-ethylcarbonyl-1,2-dihydro-2,2-dipropyl4-methyl-1-quinoline, 1-acetyl-1,2-dihydro-2,2,4,7-tetramethyl-1-quinoline, and 1-acetyl-1,2-dihydro-2,2,4,6,7-pentamethyl-1-quinoline.

The reaction between the compound (2) and hydrogen in the presence of the asymmetric cobalt complex (hereinafter, sometimes referred to as "asymmetric hydrogenation reaction") is usually carried out in a solvent.

Examples of the solvent include ether solvents (such as diethyl ether, tetrahydrofuran, methyl tetrahydrofuran, 1,4-dioxane, and methyl tert-butyl ether); halogenated hydrocarbon solvents (such as chloroform); aromatic solvents (such as toluene and xylene); as well as nitrile solvents (such as acetonitrile and propionitrile). Ether solvents are preferably included, and tetrahydrofuran or 1,4-dioxane is particularly preferably included.

The amount used of the solvent is not particularly limited, and considering the volume efficiency etc., in practical, the amount thereof is within a range of 100 or less parts by weight per 1 part by weight of the compound (2).

In the case where a monovalent cobalt complex (1) is used as an asymmetric cobalt complex, more preferably, the hydrogenation reaction of the present invention is further carried out in the presence of the divalent halogenated cobalt complex, or tetraalkylamine.

Examples of the divalent halogenated cobalt salt include $CoCl_2$, $CoBr_2$, and $CoI_2$. $CoBr_2$ is preferably included.

The amount used of the divalent halogenated cobalt salt is within a range of usually 2 moles or less per 1 mole of the hydride complex.

Examples of the trialkylamine include a trimethylamine, a triethylamine, a triisopropylamine, and a tributylamine. Triethylamine is preferably included.

The amount used of the triethylamine is within a range of usually 0.5 or more times to 3 or less times, per 1 mole of the compound (2).

The asymmetric hydrogenation reaction of the present invention is usually carried out by stirring a mixture of the asymmetric cobalt catalyst and the compound (2) under hydrogen atmosphere. The pressure at the reaction may be a normal pressure or may be pressured.

The amount used of hydrogen is within a range of usually 1 to 10 moles per 1 mole of the compound (2).

The reaction temperature is within a range of usually −40° C. to 100° C., ad preferably −20° C. to 80° C.

When the monovalent cobalt complex (1) is used as an asymmetric cobalt complex, an asymmetric hydrogenation reaction may be carried out by adding a monovalent cobalt complex (1) which is separately prepared, and as needed, a divalent halogenated cobalt salt or trialkylamine to the solution in which the compound (2) is dissolved, followed by adding hydrogen thereto, or alternatively, an asymmetric hydrogenation reaction may be carried out by adding a hydride reducing agent, an alkyl lithium compound or a Grignard reagent to a mixture containing the complex (1), the compound (2), solvent and as needed, the divalent halogenated cobalt salt or trialkylamine to perform a reduction reaction on the complex (1), followed by supplying with hydrogen thereto.

The degree of the progression of a reaction may be confirmed analysis measures such as a gas chromatography, a high performance liquid chromatography, a thin layer chromatography, a nuclear magnetic resonance spectroscopic analysis, and an infrared absorption spectroscopic analysis and the like.

Examples of the optically active compound (3) include 1-acetyl-2,2,4-trimethyl-1,2,3,4-tetrahydroquinoline, 1-acetyl-2,2,4-trimethyl-6-fluoro-1,2,3,4-tetrahydroquinoline, 1-acetyl-2,2,4-trimethyl-6-ethoxyl,2,3,4-tetrahydroquinoline, 1-acetyl-2,2-dimethyl-4-ethyl-1,2,3,4-tetrahydroquinoline, 1-acetyl-2,2-dimethyl-4-propyl-1,2,3,4-tetrahydroquinoline, 1-acetyl-2,2-dimethyl-4-butyl1,2,3,4-tetrahydroquinoline, 1-acetyl-2,2-diethyl-4-methyl-1,2,3,4-tetrahydroquinoline, 1-acetyl-2,2-dipropyl-4-methyl-1,2,3,4-tetrahydroquinoline, 1-ethylcarbonyl-2,2,4-trimethyl-1,2,3,4-tetrahydroquinoline, 1-ethylcarbonyl-2,2-dimethyl-4-ethyl-1,2,3,4-tetrahydroquinoline, 1-ethylcarbonyl-2,2-dimethyl-4-propyl-1,2,3,4-tetrahydroquinoline, 1-ethylcarbonyl-2,2-dimethyl-4-butyl-1,2,3,4-tetrahydroquinoline, 1-ethylcarbonyl-2,2-diethyl-4-methyl-1,2,3,4-tetrahydroquinoline, 1-ethylcarbonyl-2,2-dipropyl4-methyl-1,2,3,4-tetrahydroquinoline, 1-acetyl-2,2,4,7-tetramethyl-1,2,3,4-tetrahydroquinoline, and 1-acetyl-2,2,4,6,7-pentamethyl-1,2,3,4-tetrahydroquinoline.

The optically active compound (3) is usually contained in the resulting reaction mixture, and after the completion of the reaction, the optically active compound can be separated and taken out by a concentration treatment, a washing treatment, or a crystallization treatment, etc. In the below-mentioned case where the optically active compound (3) is reacted with an acid, the above reaction mixture is usually subjected to a concentration treatment and the resulting residue are used as itself.

Next, the following steps are explained, in which the optically active compound (3) is reacted with an acid to obtain the above-mentioned optically active compound represented by formula (4) (hereinafter, sometimes referred to as "optically active compound (4)"), and the optically active compound (4) is then reacted with water to obtain the above-mentioned optically active compound represented by formula (5) (hereinafter, sometimes referred to as "optically active compound (5)"). Hereinafter, a reaction between the optically active compound (3) and an acid is sometimes referred to as "isomerization reaction", and a reaction between the optically active compound (4) and water is sometimes referred to as "hydrolysis reaction", respectively.

The isomerization reaction can be carried out according to the method described in, for example, J. Chem. Soc. (C), 1966, p. 514 or JP H7-215921 A1 Example of the acid include preferably sulfuric acid.

The concentration of the sulfuric acid is within a range of usually 90% by weight to 98% by weight, and preferably 92% by weight to 97% by weight in terms of yields of the product.

The reaction between the optically active compound (3) and the acid is carried out in the absence of organic solvent, and the reaction temperature is within a range of 20° C. to 80° C.

The amount used of the acid is within a range of usually 1 part by weight to 10 parts by weight, per 1 part by weight of the optically active compound (3).

Examples of the obtained optically active compound (4) include the followings: N-acetyl-1,1,3-trimethyl-4-aminoindane, N-acetyl-7-fluoro-1,1,3-trimethyl-4-aminoindane, N-acetyl-7-ethoxy-1,1,3-trimethyl-4-aminoindane, N-acetyl-1,1-dimethyl-3-ethyl-4-aminoindane, N-acetyl-1,1-dimethyl-3-propyl-4-aminoindane, N-acetyl-1,1-dimethyl-3-butyl-4-aminoindane, N-acetyl-1,1-dipropyl-3-methyl-4-aminoindane, N-ethylcarbonyl-1,1,3-trimethyl-4-aminoindane, N-ethylcarbonyl-1,1-dimethyl-3-ethyl-4-aminoindane, N-ethylcarbonyl-1,1-dimethyl-3-propyl-4-aminoindane, N-ethylcarbonyl-1,1-dimethyl-3-butyl-4-aminoindane, N-ethylcarbonyl-1,1-diethyl-3-methyl-4-aminoindane, N-ethylcarbonyl-1,1-dipropyl-3-methyl-4-aminoindane, N-acetyl-1,1,3,6-tetramethyl-4-aminoindane, and N-acetyl-1,2,3,6,7-pentamethyl-4-aminoindane.

After the completion of the isomerization reaction, an optically active compound (4) may be taken out from the resulting reaction mixture, and a hydrolysis reaction is usually carried out by adding water to the resulting reaction mixture.

The reaction temperature for the hydrolysis reaction is within a range of usually 50° C. to 110° C.

The amount used of water is within a range of usually 1 part by weight to 10 parts by weight, per 1 part by weight of the optically active compound (4).

Examples of the obtained optically active compound (5) include 1,1,3-trimethyl-4-aminoindane, 7-fluoro-1,1,3-trimethyl-4-aminoindane, 7-ethoxy-1,1,3-trimethyl-4-aminoindane, 1,1-dimethyl-3-ethyl-4-aminoindane, 1,1-dimethyl-3-propyl-4-aminoindane, 1,1-dimethyl-3-butyl-4-aminoindane, 1,1-dipropyl-3-methyl-4-aminoindane, 1,1-diethyl-3-methyl-4-aminoindane, 1,1,3,6-tetra-methyl-4-aminoindane, and 1,1,3,6,7-penta-methy-4-aminoindane.

The resulting reaction mixture is neutralized with alkali and is extracted with organic solvents which is immiscible with water (such as toluene) to obtain a solution containing an optically active compound (5). The enantiomeric ratio of the optically active compound (5) (R-isomer/S-isomer or S-isomer/R-isomer) is within a range of usually 60/40 to 90/10.

Next, among the optically active compound (5) obtained above, it is explained a step of dissolving an optically active 1,1,3-trimethyl-4-aminoindane ($R^6$, $R^7$ and $R^8$ each represents a methyl group, and $R^9$, $R^{10}$ and $R^{11}$ each represents a hydrogen atom) in solvent, followed by performing an optical resolution with an optically active tartaric acid (hereinafter, sometimes referred to as "optical Resolution").

For the optical resolution of 1,1,3-trimethyl-4-aminoindane, it is described in WO 2015/118793 A1, and the optical resolution of the present invention can be also carried out according to the descriptions in this WO publication. In this WO publication, it is described that 1,1,3-trimethyl-4-aminoindane wherein the optical purity is within a range of 0% e.e. to 25% e.e. (that is, the enantiomeric ratio (R-isomer/S-isomer or S-isomer/R-isomer) is within a range of 50/50 to 62.5/37.5) is subjected to an optical resolution procedure. According to the disclosures described herein, an 1,1,3-trimethyl-4-aminoindane having high optical purity which is obtained via the asymmetric hydrogenation reaction, the isomerization reaction, and the hydrolysis reaction as explained above is subjected to an optical resolution to obtain the 1,1,3-trimethyl-4-aminoindane having further more optical purity more effectively. The optical purity of the 1,1,3-trimethyl-4-aminoindane which is applied to the optical resolution of the present invention is within a range of usually 40% e.e. to 80% e.e. (for example, 66% e.e. or more) (that is, the enantiomeric ratio (R-isomer/S-isomer or S-isomer/R-isomer) is within a range of 70/30 to 90/10). The above-mentioned optically active compound represented by formula (7) has been known that its R-isomer shows higher efficacy on controlling plant disease than its S-isomer (see WO 2011/162397 A1), and the 1,1,3-trimethyl-4-aminoindane has preferably a preferentially higher ratio of the R-isomer in terms of usefulness as intermediate compound. That is, the 1,1,3-trimethyl-4-aminoindane which is applied to the optical resolution of the present invention has preferably the enantiomeric ratio of 70/30 or more as R-isomer/S-isomer, or and more preferably has a range of 70/30 to 90/10.

In order to improve the ratio of R-isomer by performing the optical resolution of 1,1,3-trimethyl-4-aminoindane having the preferentially higher ratio of the R-isomer, D-tartaric acid is used as an optically active tartaric acid, whereas, in order to improve the ratio of S-isomer by performing the optical resolution of 1,1,3-trimethyl-4-aminoindane having the preferentially higher ratio of the S-isomer, L-tartaric acid is used as an optically active tartaric acid.

The optically active tartaric acid is usually commercially available.

The amount used of the optical active tartaric acid is within a range of usually 0.7 moles to 1.3 moles, preferably 0.8 moles to 1.2 moles, per 1 mole of the optically active 1,1,3-trimethyl-4-aminoindane (total amounts of R-isomer and S-isomer).

Examples of the solvent include alcohol solvents (such as methanol, ethanol, and 2-propanol); ether solvents (such as tetrahydrofuran); nitriles (such as acetonitrile); esters (such as ethyl acetate); aromatic hydrocarbon solvents (such as toluene, xylene, and ethyl benzene); halogenated aromatic hydrocarbon solvents (such as monochloro benzene); aliphatic hydrocarbon solvents (such as heptane and hexane); alicyclic hydrocarbon solvents (such as cyclohexane); and water. Two or more of these solvents may be used. Examples of the solvents include preferably alcohols solvents, water, or mixed solvent thereof.

The amount used of the solvent is within a range of usually 0.5 parts by weight to 10 parts by weight, per 1 part by weight of the optically active 1,1,3-trimethyl-4-aminoindane.

The optical resolution of the present invention is preferably carried out by mixing the optically active 1,1,3-trimethyl-4-aminoindane, the optically active tartaric acid, and solvent.

The mixing temperature is usually within a range of 20° C. to 70° C.

The mixing order is not particularly limited, the optically active 1,1,3-trimethyl-4-aminoindane, the optically active tartaric acid, and solvent may be mixed at once, or the optically active 1,1,3-trimethyl-4-aminoindane may be added to a mixture of the optically active tartaric acid and solvent, or a mixture of the optically active tartaric acid and solvent may be added to the optically active 1,1,3-trimethyl-4-aminoindane, or the optically active tartaric acid may be added to a mixture of the optically active 1,1,3-trimethyl-4-aminoindane and solvent.

In the case where a mixture solvent of the alcohol solvent and water is used, the optically active 1,1,3-trimethyl-4-aminoindane, the optically active tartaric acid, methanol and water may be mixed at once, or the optically active 1,1,3-trimethyl-4-aminoindane may be added to a mixture of the optically active tartaric acid, the alcohol solvent and water, or a mixture of the optically active tartaric acid, the alcohol solvent and water may be added to the optically active 1,1,3-trimethyl-4-aminoindane, or water may be added to a mixture of the optically active tartaric acid, the alcohol solvent, and the optically active 1,1,3-trimethyl-4-aminoindane, or the optically active tartaric acid may be added to a mixture of the optically active 1,1,3-trimethyl-4-aminoindane, the alcohol solvent and water.

With regard to the mixing order of these materials, the materials to be added later may be added at the whole amount thereof at once, may be added portionwise (for example, dropwise), or may be added continuously. In the case where the optically active tartaric acid is added to a mixture of the optically active 1,1,3-trimethyl-4-aminoindane and solvent, the optically active tartaric acid is preferably added continuously.

Usually, at the completion of mixing, the resulting mixture is in a form of a solution, and the solution is cooled to precipitate out a crystal containing salt of the optically active 1,1,3-trimethyl-4-aminoindane and the optically active tartaric acid salt. When the alcohol solvent is used, the crystal precipitated out is usually in a form of a solvate thereof.

The temperature after cooling is a lower temperature than the above-mentioned mixing temperature, and is within a range of preferably −20° C. to 30° C., and more preferably −10° C. to 20° C.

The cooling rate is within a range of usually 1° C./hr. to 10° C./hr., and cooling the mixture at the cooling rate can precipitate out a crystal containing the 1,1,3-trimethyl-4-aminoindane having high optical purity and the optically active tartaric acid. The cooling rate is within a range of preferably 1° C./hr. to 8° C./hr., and more preferably 3° C./hr. to 6° C./hr.

The resulting mixture is subjected to a filtering treatment to obtain a crystal containing the optically active 1,1,3-trimethyl-4-aminoindane and the optically active tartaric acid. In the case where the 1,1,3-trimethyl-4-aminoindane having the preferentially higher ratio of the R-isomer, the D-tartaric acid and methanol are mixed, and the resulting mixture is subjected to an optical resolution, the resulting mixture is subjected to a filtering treatment to separate a crystal containing a methanol solvate of (R)-1,1,3-trimethyl-4-aminoindane D-tartaric acid salt, and a solution containing (S)-1,1,3-trimethyl-4-aminoindane and D-tartaric acid salt.

The obtained crystal may be washed with a solvent used for the optical resolution, or the above-mentioned other solvent which can be used for the optical resolution, and may be dried as needed.

An aqueous solution of the crystal obtained by these procedures and an alkali metal hydroxide are mixed to decompose the optically active 1,1,3-trimethyl-4-aminoindane and an alkali metal salt of the optically active tartaric acid.

Examples of the alkali metal hydroxide include sodium hydroxide and potassium hydroxide.

The amount used of the alkali metal hydroxide is within a range of usually 1 mole to 3 moles, per 1 mole of the optically active tartaric acid used in the optical resolution.

The mixture temperature is within a range of usually 10° C. to 80° C.

The mixing of the aqueous solution of the alkali metal hydroxide may be carried out in the presence of organic solvent. Examples of the organic solvent include aromatic hydrocarbon solvents (such as toluene, xylene, and ethyl benzene); halogenated aromatic hydrocarbon solvents (such as monochlorobenzene); aliphatic hydrocarbon solvents (such as heptane and hexane); alicyclic hydrocarbon solvents (such as cyclopentane and cyclohexane); ether solvents (such as diethyl ether, and tert-butylmethyl ether); and ester solvents (such as ethyl acetate).

The amount used of the organic solvent is within a range of usually 10 parts by weight or less, per 1 part by weight of crystal containing the optically active 1,1,3-trimethyl-4-aminoindane and the optically active tartaric acid salt.

With regard to the mixing order, the crystal containing the optically active 1,1,3-trimethyl-4-aminoindane and the optically active tartaric acid salt, the aqueous solution of the alkali metal hydroxide, as needed, organic solvent may be mixed at once, or the aqueous solution of the alkali metal hydroxide may be added to a mixture of the above crystal and the organic solvent, or the above crystal may be added to a mixture of the aqueous solution of the alkali metal hydroxide and organic solvent. The above crystal is particularly preferably added a mixture of the alkali metal hydroxide and the organic solvent.

After a completion of the mixing, an aqueous layer is removed from the resulting mixture, and as needed, organic solvent is distilled off from the resulting organic layer to take out the optically active 1,1,3-trimethyl-4-aminoindane. The optical activity of the obtained 1,1,3-trimethyl-4-aminoindane is higher than those of the 1,1,3-trimethyl-4-aminoindane which is subjected to an optical resolution.

Next, a method for preferential crystallization by an acid is explained.

The preferential crystallization of the present invention comprises a step of mixing the optically active 1,1,3-trimethyl-4-aminoindane with an achiral acid in the presence of solvent to precipitate out the salts with these acids (the first step 1), and a step of mixing the acid salts obtained in the step 1 with a base to obtain the optically active 1,1,3-trimethyl-4-amioindane.

First, the first step 1 is explained, in which the solution containing the optically active 1,1,3-trimethyl-4-aminoindane and an acid are mixed to precipitate out an acid salt.

When the optically active 1,1,3-trimethyl-4-aminoindane which is applied to the first step 1 has an optical purity of 40% e.e. or more (such as 66% e.e. or more), the optical purity of the optical active 1,1,3-trimethyl-4-aminoindane which is obtained in the second step is preferably prone to have higher optical purity (usually, 89% e.e. or more, for example, 91% e.e. or more, 92% e.e. or more, 96% e.e. or more, 97% e.e. or more, 99% e.e. or more) than those of the first step. In term of the usefulness of the synthetic intermediate of the compound having an efficacy on preventing a plant disease described in the above Patent document 1, the optically active 1,1,3-trimethyl-4-aminoindane has preferably preferentially more R-isomer than S-isomer. When the optically active 1,1,3-trimethyl-4-aminoindan which is applied to the first step contains preferentially more R-isomer than S-isomer, usually, the optically active 1,1,3-trimethyl-4-aminoindane which is obtained in the second step is prone to contain more R-isomer than S-isomer.

Each structural formula of R-isomer and S-isomer of the 1,1,3-trimethyl-4-aminoindane represents below.

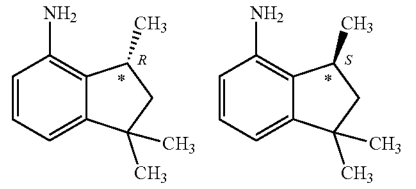

Example of the process for preparing the optically active 1,1,3-trimethyl-4-aminoindane include the following method: in which 2,2,4-trimethyl-1-quinoline is acylated with an optically active acylating agent, and then followed by a hydrogenation reaction, to obtain an optically active 2,2,4-trimethyl-1,2,3,4-tetrahydroquinoline derivative, and which is subjected to an isomerization reaction using sulfuric acid, and then a hydrolysis reaction (for example, see JP H7-215921 A1). It has been also known that the 2,2,4-trimethyl-1-quinoline derivative can be subjected to an asymmetric hydrogenation reaction to obtain the above-mentioned optically active 2,2,4-trimethyl-1,2,3,4-tetrahydroquinoline derivative (see for example, WO 2015/141564 A1), and next which is subjected to an isomerization reaction using sulfuric acid, followed by performing a hydrolysis reaction to obtain the optically active 1,1,3-trimethyl-4-aminoindane. In the first step of the present invention, the optically active 1,1,3-trimethyl-4-aminoindane which is obtained by these processes can be supplied.

The acid may be an achiral acid, and any acid may be used as long as it can preferentially precipitate out the optically active salt of an more abundant optically active form among the optically active substance contained in the optically active 1,1,3-trimethyl-4-aminoindane.

In order to form the salts, an acid having less than 2.8 of an acid dissociation constant (pKa) is usually used.

Here the acid dissociation constant means one of an indicator showing acid strength, which is expressed by the equilibrium constant (Ka) of the acid ionization equilibrium when considering the acid dissociation reaction in which hydrogen ions are released from the acid, or the dissociation constant (pKa), which is the negative common logarithm. It means that the larger the equilibrium constant Ka value is, or the smaller the dissociation constant pKa value is, the acid is the stronger acid.

As the acid dissociation constant (pKa) in the present invention, when a calculated value (a value calculated using Advanced Chemistry Development (ACD/Labs) Software V11.02) is recorded in SciFinder, which is a database provided by Chemical Abstracts Service, the value is adopted. Such values can be searched, for example, from the website of the Japan Chemical Information Society (https://www.jaici.or.jp/SCIFINDER/). For acids whose calculated values are not recorded in SciFinder, the data published on the Chemical Book homepage (https://www.chemicalbook.com/) is adopted, for acids not listed on this website, the values published in Applied Catalysis A: General 492 (2015) 252-261 are adopted, and furthermore, if the data are not published in such journals, the values calculated using Advanced Chemistry Development (ACD/Labs) Software V11.02 are adopted.

Examples of the acid having less than 2.8 of the acid dissociation constant (pKa) include sulfuric acid, hydrogen sulfate salt, sulfamic acid, organic sulfonic acid, hydrohalic acid, phosphoric acid, organic phosphates, nitric acid, tetrafluoroboric acid, and carboxylic acid, and one or more acid selected from a group consisting of these acids are preferably used.

Examples of the hydrogen sulfate salt include alkali metal salts of hydrogen sulfate (such as sodium hydrogen sulfate, lithium hydrogen sulfate, and potassium hydrogen sulfate).

Examples of the organic sulfonic acid methane sulfonic acid, ethane sulfonic acid, benzene sulfonic acid, p-toluenesulfonic acid, camphor sulfonic acid, and taurine.

Examples of the hydrohalic acid include hydrochloric acid, hydrobromic acid, and hydroiodic acid.

Examples of the organic phosphates include phosphoric acid dihydrogen phenyl, phosphoric acid dihydrogen ethyl, and phenyl phosphoric acid, and methyl phosphoric acid.

Examples of the carboxylic acid include oxalic acid, trichloroacetic acid, trifluoroacetic acid, dichloroacetic acid, monochloroacetic acid, monobromoacetic acid, 2-nitrobenzoic acid, and pentafluorophenyl carboxylic acid.

Among them, one or more acids selected from the group consisting of sulfuric acid, hydrogen sulfate salt, sulfamic acid, organic sulfonic acid, hydrohalic acid, phosphoric acid, organic phosphates, nitric acid, tetrafluoroboric acid, and carboxylic acid is more preferably used. One or more acids selected from the group consisting of sulfuric acid, sodium hydrogen sulfate, potassium hydrogen sulfate, sulfamic acid, methane sulfonic acid, p-toluenesulfonic acid, benzene sulfonic acid, hydrochloric acid, hydrobromic acid, phosphoric acid, phenyl phosphoric acid, phosphoric acid dihydrogen phenyl, nitric acid, tetrafluoroboric acid, oxalic acid, trifluoroacetic acid, trichloroacetic acid, 2-nitrobenzoic acid, chloroacetic acid and bromoacetic acid are further preferably used. One or more acid selected from the group consisting of sulfuric acid, sodium hydrogen sulfate, potassium hydrogen sulfate, sulfamic acid, methane sulfonic acid, p-toluenesulfonic acid, benzene sulfonic acid, hydrochloric acid, hydrobromic acid, phosphoric acid, phenyl phosphoric acid, phosphoric acid dihydrogen phenyl, nitric acid, tetrafluoroboric acid, oxalic acid, trifluoroacetic acid, trichloroacetic acid, and 2-nitrobenzoic acid are furthermore preferably used.

The amount used of the acid is within a range of usually 0.7 moles to 1.5 moles, preferably 0.7 moles to 1.0 mole of the acid in the case of any acid other than sulfuric acid, and is within a range of usually 0.35 moles to 0.5 moles, preferably 0.35 moles to 0.45 moles of the acid in the case of sulfuric acid, per 1 mole of the optically active 1,1,3-trimethyl-4-aminoindane.

Examples of the solvents include alcohol solvents (such as methanol, ethanol, and 2-opropanol); water; ether solvents (such as tetrahydrofuran); nitrile solvents (such as acetonitrile); ester solvents (such as ethyl acetate); aromatic hydrocarbon solvents (such as toluene, xylene, and ethyl benzene); halogenated aromatic hydrocarbon solvents (such as monochlorobenzene); aliphatic hydrocarbon solvents (such as heptane, and hexane); and acyclic hydrocarbon solvents (such as cyclopentane and cyclohexane), and include preferably the alcohol solvents, the aromatic hydrocarbon solvents, and water. A mixture of two or more solvents of these solvents may be used.

The amount used of the solvent is within a range of 0.5 parts by weight to 20 parts by weight, preferably 1.0 part by weight to 10 parts by weight, per 1 part by weight of 1,1,3-trimethyl-4-aminoindane.

The mixing temperature is within a range of usually 20° to 100° C.

With respect to the mixing order, the 1,1,3-trimethyl-4-aminoindane, the acid and the solvent may be mixed at once, or after mixing the acid and the solvent, the 1,1,3-trimethyl-4-aminoindane may be added to the resulting mixture. A mixture of the acid and the solvent may be added to the 1,1,3-trimethyl-4-aminoindane. Also, after mixing the 1,1,3-trimethyl-4-aminoindane with the solvent, the acid or a mixture of the acid and the solvent may be added to the resulting mixture. Preferably after the 1,1,3-trimethyl-4-aminoindane and the solvents are mixed, the acid or the mixture of the acid and the solvent may be added to the resulting mixture. Also after the mixing, when no crystal is precipitated out by cooling the resulting mixture, a crystal may be precipitated out by distilling off a part of solvents.

The mixing may be carried out by adding all of the ingredients collectively at once, may be carried out by adding these ingredients continuously, or may be carried out by dividing portionwise (for example, adding dropwise) of these ingredients. When the acid is added to a mixture of the 1,1,3-trimethyl-4-aminoindane and the solvent, the acid may be added collectively at once, or may be added continuously, and is preferably added by dividing portionwise.

Though the optically active 1,1,3-trimethyl-4-aminoindane acid salt may be precipitated out merely by mixing a solution of the optically active 1,1,3-trimethyl-4-aminoindane and the acid, usually, the resulting mixture can be cooled to precipitate out the optically active 1,1,3-trimethyl-4-aminoindane acid salt. The salts which are precipitated out from the mixture can be separated by a solid-liquid separation treatment such as a filtration to separate into the optically active 1,1,3-trimethyl-4-aminoindane acid salt and a solution of the remaining 1,1,3-trimethyl-4-aminoindane and its acid salts. Even if no crystal of the optically active 1,1,3-trimethyl-4-aminoindane is precipitated out by cooling the resulting mixture, a crystal may be precipitated out by distilling off the part of solvents.

The temperature after the cooling is below the above-mentioned mixing temperature, and is within a range of preferably −20° C. to 30° C., and more preferably −10° C. to 20° C.

The cooling rate is not particularly limited, and is within a range of usually around 1° C./hr. to around 100° C./hr.

The optically active 1,1,3-trimethyl-4-aminoindane acid salt which is taken out in the first step may be supplied as itself to the second step, however, may be supplied after washing the acid salts with at least one of the solvents which is selected from the above-mentioned solvents. Also as needed, the acid salts may be supplied to the second step after drying.

Next, the second step is explained, in which the acid salts obtained in the first step and the base are mixed to obtain the optically active 1,1,3-trimethyl-4-aminoindane.

The base may be used without any limitations, as long as it is a base showing a base strength which is capable of decomposing the optically active 1,1,3-trimethyl-4-aminoindane acid salt.

Examples of the base include an inorganic base and an organic base.

Examples of the inorganic base include alkali metal hydroxides, alkaline earth metal hydroxides, alkali metal carbonates, alkali earth metal carbonates, and alkali metal phosphates.

Examples of the alkali metal hydroxide include sodium hydroxide and potassium hydroxide.

Examples of the alkali earth metal hydroxides include calcium hydroxide and magnesium hydroxide.

Examples of the alkali metal carbonates include potassium carbonate and sodium carbonate.

Examples of the alkaline earth metal carbonates include calcium carbonate and magnesium carbonate.

Examples of the alkali metal phosphates include trisodium phosphate and tripotassium phosphate.

The alkali metal hydroxides are preferably included.

Examples of the organic bases include a tertiary amine, a secondary amine, and a primary amine.

Examples of the tertiary amines include triethyl amine, tripropyl amine, and tributyl amine, Examples of the secondary amines include diethyl amine, dipropyl amine, and dibutyl amine.

Examples of the primary amines include butyl amine, and benzyl amine.

The tertiary amines are preferably included.

The amount of the bases is within a range of usually 0.5 moles to 3 moles in terms of base conversion, per 1 mole of the acid used in the first step. The mixing temperature is within a range of usually 10° C. to 80° C.

The mixing between the acid obtained in the first step and the base may be carried out in the presence of the organic solvent and/or water. Examples of the organic solvents include aromatic hydrocarbon solvents (such as toluene, xylene and ethyl benzene); halogenated aromatic hydrocarbon solvents (such as monochlorobenzene); aliphatic hydrocarbon solvents (such as heptane and hexane); acyclic hydrocarbon solvents (such as cyclopentane and cyclohexane); ether solvents (such as diethyl ether, and tert-butylmethyl ether); ester solvents (such as ethyl acetate); and mixed solvents of two or more of these solvents, but are not limited to them. The amounts used of the organic solvents and/or water are within a range of usually 10 parts by weight or less in total thereof, per 1 part by weight of the salt.

With respect to the mixing order, the optically active 1,1,3-trimethyl-4-aminoindane acid salt, a base which was made an aqueous solution as needed, an aqueous solution of the base, and as needed, an organic solvent, may be mixed at once, or the mixture of the acid salt and as needed, organic solvent, and a base which was made an aqueous solution as needed may be mixed. Also the acid base may be added to a mixture of a base which was made an aqueous solution as needed and as needed, the organic solvent. Particularly preferably, the acid salt is added to a mixture of the organic solvent and a base which was made an aqueous solution as needed.

After a completion of the mixing, the mixture is usually separated into an organic layer and an aqueous layer, and the mixture is then subjected to a separatory treatment with a separatory funnel to obtain the organic layer, and as needed, the organic solvent is distilled off to take out the optically active 1,1,3-trimethyl-4-aminoindane from the mixture. As aforementioned, the optical purity of the optically active 1,1,3-trimethyl-4-aminoindane so obtained is usually higher than the optical purity of the optically active 1,1,3-trimethyl-4-aminoindane which is supplied to the first step.

Also in the case where the optically active 1,1,3-trimethyl-4-aminoindane is applied to the below-mentioned amidation reaction D, the compound as the acid salt itself is subjected to a reaction with the compound represented by formula (1-3) to neutralize the acid salt with the base in the reaction system, and then afford the optically active 1,1,3-trimethyl-4-aminoindane, which is reacted with the compound represented by formula (1-3) to proceed with the second step and the amidation reaction D of the present invention continuously.

At last, the following step is explained, in which the obtained active 1,1,3-trimethyl-4-aminoindane which is obtained via the above-mentioned asymmetric hydrogenation reaction, the isomerization reaction, and the hydrolysis reaction, as well as needed, the optical resolution (or the preferential crystallization) is reacted with the above-mentioned compound represented by formula (6) (hereinafter, sometimes referred to as "compound (6)") to obtain the optically active compound represented by the above formula (7) (hereinafter, sometimes referred to as "optically active Compound (7)". Hereinafter, the reaction of the optically active 1,1,3-trimethyl-4-aminoindane with the compound (6) is sometimes referred to as "amidation reaction".

$R^{12}$ in the above formula (6) represents preferably a hydrogen atom or a methyl group, and more preferably a hydrogen atom.

Examples of $R^{13}$ include preferably a methyl group, a monofluoromethyl group, a difluoromethyl group, or a trifluoromethyl group, and more preferably a difluoromethyl group.

Examples of $R^{14}$ include preferably a chlorine atom, an ethoxy group, and a hydroxy group, and a chlorine atom is more preferably included.

Examples of the compound (6) include ethyl 1-methyl-3-difluoromethylpyrazol-4-carboxylate, 1-methyl-3-difluoromethylpyrazol-4-carboxylic acid, and 1-methyl-3-difluromethylpyrazol-4-carboxylic acid chloride.

Examples of the obtained optically active compound (7) include (R)-(−)—N-(1,1,3-trimethyl-indan-4-yl)-1-methyl-3-difluorometylpyrazol-4-carboxylic acid amide.

The amidation reaction may be carried under a condition where the optically active 1,1,3-trimethyl-4-aminoindane and the compound (6) are reacted, however, the following amidation reactions A, B, C or D is preferably included.

<Amidation Reaction A>

The amidation reaction A represents a reaction in which the optically active 1,1,3-trimethyl-4-aminoindane is reacted with the above-mentioned compound represented by formula (6) wherein $R^{14}$ represents a hydroxy group (hereinafter, sometimes referred to as "compound (6-1)") in the presence of a dehydration and condensation agent to obtain the optically active compound (7).

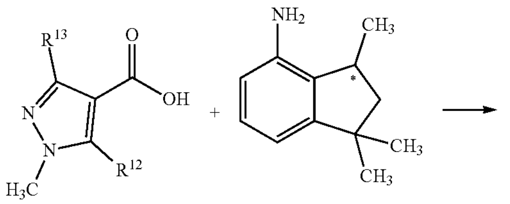

(6-1)

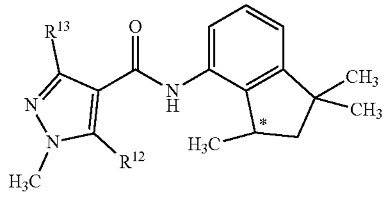

(7)

(wherein $R^{12}$ and $R^1$ are the same meanings as above)

Examples of the dehydration and condensation agent include carbodiimide compounds such as 1-ethyl-3-(3-dimethylaminopropyl)carbodiimide hydrochloric acid salt, and 1,3-dicyclohexylcabodiimide, and (benzotriazol-1-yloxy) tris(dimethylamino)phosphonium hexafluorophosphate.

The amount used of the hydration and condensation agent is within a range of usually 1 mole to 5 moles per 1 mole of the compound (6-1).

The amount used of the optically active 1,1,3-trimethyl-4-aminoindane is within a range of usually 0.5 moles to 3 moles per 1 mole of the compound (6-1).

The reaction of the optically active 1,1,3-trimethyl-4-aminoindane and the compound (6-1) is usually carried out in the presence of an inactive solvent to the reaction. Examples of the solvent include ether solvents (such as tetrahydrofuran, dioxane, ethylene glycol dimethyl ether, and tert-butylmethyl ether); aliphatic hydrocarbon solvents (such as hexane, heptane, and octane); aromatic hydrocarbon solvents (such as toluene, xylene, and ethyl benzene); halogenated hydrocarbon solvents (such as chlorobenzene); ester solvents (such as butyl acetate and ethyl acetate); nitrile solvents (such as acetonitrile); acid amide solvents (such as N,N-dimethyl formamide); sulfoxide solvents (such as dimethyl sulfoxide); and nitrogen-containing aromatic compound solvents (such as pyridine); as well as mixed solutions of these two or more solvents. The amount used of the solvent is within a range of usually 1 part by weight to 20 parts by weight, per 1 part by weight of the compound (6-1). The reaction temperature is within a range of usually −20° C. to 150° C., and the reaction period of the reaction is within a range of usually 1 hour to 24 hours.

After the completion of the reaction, the resulting mixture can be mixed with water; an aqueous solution of a base (such as aqueous solution of sodium hydrogen carbonate, aqueous solution of sodium carbonate, aqueous solution of ammonium chloride, aqueous solution of sodium hydroxide, or aqueous solution of potassium hydroxide); an aqueous solution of an acid (such as hydrochloric acid, sulfuric acid, phosphoric acid, and acetic acid) to precipitate out a solid, and the resulting mixture is filtered to take out the optically active compound (7). When no solid is precipitated out, the resulting mixture is extracted with organic solvent, and the organic layer is subjected to worked-up treatments (such as separation, drying, and concentration) to take out the optically active compound (7). The organic layer may be washed with water; an aqueous solution of alkali metal hydrogen carbonate salt (such as aqueous solution of sodium hydrogen carbonate); aqueous solution of alkali metal carbonate salt (such as aqueous solution of sodium carbonate); an aqueous solution of ammonium chloride; an aqueous solution of alkali metal hydroxide (such as aqueous solution of sodium hydroxide and aqueous solution of potassium hydroxide); or an aqueous solution of an acid (such as hydrochloric acid, sulfuric acid, phosphoric acid, and acetic acid). The washing of the organic layer is carried out at the range of usually 0° C. to 70° C., preferably 20° C. to 60° C. The taken out optically active compound (7) may be further purified by a column chromatography or a recrystallization.

<Amidation Reaction B>

An amidation reaction B represents a step of reacting the optically active 1,1,3-trimethyl-4-aminoindane with the compound (6-1) in the presence of a Lewis acid to obtain the optically active compound (7).

Examples of the Lewis acid include metal chloride compounds (such as titanium tetrachloride, zirconium tetrachloride, and aluminum chloride); metal alkoxides compounds (such as titanium ethoxide, titanium propoxide, zirconium ethoxide, zirconium propoxide, aluminum ethoxide, aluminum propoxide, antimony ethoxide, and antimony propoxide); metal amide compounds (such as tetrakis(dimethylamino)titanium, dichloro bis(dimethylamino)titanium, and tetrakis(diethylamino)titanium); boron compounds (such as boric acid, 3,5-bis(trifluoromethyl)phenyl boronic acid, 2,4-bis(trifluoromethyl)phenyl boronic acid, and pentafluorophenyl boronic acid); and borate compounds (such as triphenylmethyltetrakis(pentafluorophenyl)borate, triphenylmethyl tetrakis(3,5-bistrifluoromethylphenyl)borate, and N,N-dimethyl anilinium tetrakis(pentafluorophenyl)borate)).

The amount used of the Lewis acid is within a range of usually 0.001 moles to 3 moles per 1 mole of the compound (6-1).

The amount used of the optically active 1,1,3-trimethyl-4-aminoindane is within a range of usually 0.5 moles to 3 moles per 1 mole of the compound (6-1).

A reaction of the optically active 1,1,3-trimethyl-4-aminoindane and the compound (6-1) is usually carried out in the presence of an inactive solvent to the reaction. Examples of the solvent include any solvents which is described above as the solvent capable of being used in the amidation reaction A. The amount used of the solvent is within a range of usually 1 part by weight to 20 parts by weight per 1 part by weight of the compound (6-1). The reaction temperature is within a range of usually −20° C. to 150° C., and the reaction period of the reaction is within a range of usually 1 hour to 120 hours, and the reaction is preferably carried out while removing the water as a by-product.

After the completion of the reaction, the resulting mixture is subjected to a similar treatment to the amidation reaction A to take out the optically active compound (7).

<Amidation Reaction C>

An amidation reaction C represents a step in which the optically active 1,1,3-trimethyl-4-aminoindane and the above-mentioned compound represented by formula (6) wherein $R^{14}$ represents a C1-C10 alkoxy group which may be optionally substituted with one or more halogen atoms (hereinafter, sometimes referred to as "compound (6-2)") in the presence of a Lewis acid or a Lewis base to obtain the optically active compound (7).

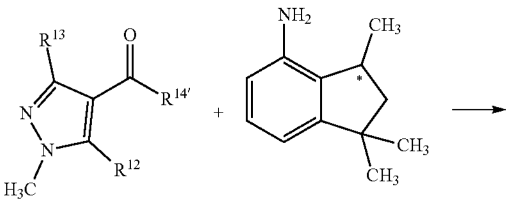

(6-2)

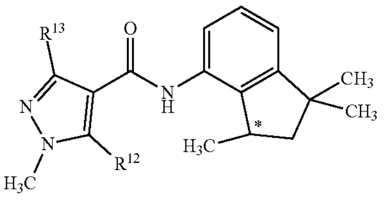

(7)

(wherein $R^{12}$ and $R^{13}$ have the same meanings as above, and $R^{14'}$ represents a C1-C10 alkoxy group which may be optionally substituted with one or more halogen atoms).

Examples of the Lewis acid include metal chloride compounds (such as titanium tetrachloride, zirconium tetrachloride, and aluminum chloride); and metal alkoxide compounds (such as titanium ethoxide, titanium propoxide, zirconium ethoxide, zirconium propoxide, aluminum ethoxide, aluminum propoxide, antimony ethoxide, and antimony propoxide).

The amount used of the Lewis acid is within a range of usually 0.01 moles to 3 moles per 1 mole of the compound (6-2).

The amount used of the optically active 1,1,3-trimethyl-4-aminoindane is within a range of usually 0.5 moles to 3 moles per 1 mole of the compound (6-2).

Examples of the Lewis base include metal alkoxide compounds (such as sodium methoxide, sodium ethoxide, sodium tert-butoxide, potassium methoxide, potassium ethoxide, and potassium tert-butoxide); metal hydride compounds (such as sodium hydride); lithium compounds (such as lithium dipropylamide and tert-butyl lithium); and silicon compounds (such as sodium hexamethyl disilazane, and potassium hexamethyl disilazane); and aluminium compounds (such as trimethyl aluminum, triethyl aluminum, and triisobutyl aluminium).

The amount used of the Lewis base is within a range of usually 0.01 moles to 3 moles per 1 mole of the compound (6-2).

The amount used of the optically active 1,1,3-trimethyl-4-aminoindane is within a range of usually 0.5 moles to 3 moles per 1 mole of the compound (6-2).

The reaction of the optically active 1,1,3-trimethyl-4-aminoindane and the compound (6-2) is usually carried out in the presence of an inactive solvent to the reaction. Examples of the solvent include any solvents which is described as the solvent capable of being used in the amidation reaction A. The amount used of the solvent is within a range of usually 1 part by weight to 20 parts by weight per 1 part by weight of the compound (6-2). The reaction temperature is within a range of usually −20° C. to 150° C., and the reaction period of the reaction is within a range of usually 1 hour to 110 hours, and the reaction is preferably carried out while removing the alcohol as a by-product.

After the completion of the reaction, the resulting mixture is subjected to a similar treatment to the amidation reaction A to take out the optically active compound (7).

<Amidation Reaction D>

An amidation reaction D represents a step in which the optically active 1,1,3-trimethyl-4-aminoindane and the above-mentioned compound represented by formula (6) wherein $R^{14}$ represents a halogen atom (hereinafter, sometimes referred to as "compound (6-3)") in the presence of a base to obtain an optically active compound (7).

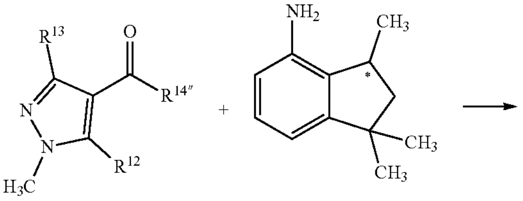

(6-3)

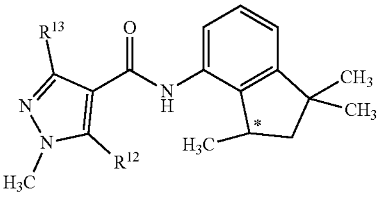

(7)

(wherein $R^{12}$ and $R^{13}$ have the same meanings as above, and $R^{14''}$ represents a halogen atom).

Examples of the base include alkali metal carbonate salts (such as sodium carbonate and potassium carbonate); the tertiary amines (such as triethyl amine and diisopropyl ethyl amine); and nitrogen-containing aromatic compounds (such as pyridine and 4-dimethylaminopyridine).

The amount used of the base is within a range of usually a catalytic amount to 5 moles, preferably 1 mole to 3 moles, per 1 mole of the optically active 1,1,3-trimethyl-4-aminoindane.

The amount used of the compound (6-3) is within a range of usually 0.5 moles to 1.5 moles, preferably 0.8 moles to 1.3 moles, and more preferably 1.0 mole to 1.2 moles, per 1 mole of the optically active 1,1,3-trimethyl-4-aminoindane.

The reaction of the optically active 1,1,3-trimethyl-4-aminoindane and the compound (6-3) is usually out in the presence of solvent. The solvent may be any solvent as long as it is inactive to the reaction, and examples of the solvent include aliphatic hydrocarbon solvents (such as pentane, hexane, heptane, octane, and cyclohexane); aromatic hydrocarbon solvents (such as toluene, xylene, and ethyl benzene); halogenated aliphatic hydrocarbon solvents (such as dichloromethane, chloroform, 1,2-dichloroethane, and carbon tetrachloride); halogenated aromatic hydrocarbon solvents (such as chlorobenzene, dichlorobenzene, and trichlorobenzene); ether solvents (such as diethyl ether, diisopropyl ether, tert-butyl methyl ether, cyclohexyl methyl ether, ethylene glycol dimethyl ether, tetrahydrofuran, and dioxane);

esters solvents (such as ethyl acetate and butyl acetate); and nitrile solvents (such as acetonitrile); and mixed solution of two or more of these solvents, and include preferably the aromatic hydrocarbon solvents, the halogenated aromatic hydrocarbon solvents, and ether solvents, and include more preferably toluene, xylene, ethyl benzene, chlorobenzene, and tetrahydrofuran. The amount used of the solvent is within a range of preferably 1 part by weight to 20 parts by weight, and more preferably 2 parts by weight to 10 parts by weight, per 1 part by weight of the optically active 1,1,3-trimethyl-4-aminoindane.

The reaction temperature is within a range of usually −20° C. to 80° C., preferably 0° C. to 70° C., and more preferably 20° C. to 60° C., and the reaction period of the reaction is within a range of usually 0.1 hours to 24 hours.

After the completion of the reaction, the resulting mixture is subjected to a similar treatment to the amidation reaction A to take out the optically active compound (7).

The taken out optically active compound (7) may be further purified by a column chromatography and a recrystallization, and is preferably further purified.

Examples of the purification method include preferably a method in which the optically active compound (7) is dissolved in solvent to prepare a solution, and a recrystallization procedure is then carried out using the prepared solution.

A seed crystal may be used in the recrystallization.

Examples of the solvents include aliphatic hydrocarbon solvents (such as pentane, hexane, heptane octane, and cyclohexane); aromatic hydrocarbon solvents (such as toluene, xylene, and ethyl benzene); halogenated aliphatic hydrocarbon solvents (such as dichloromethane, chloroform, 1,2-dichloroethane) and carbon tetrachloride); halogenated aromatic hydrocarbon solvents (such as chlorobenzene, dichlorobenzene, and trichlorobenzene); ether solvents (such as diethyl ether, diisopropyl ether, tert-butyl methyl ether, cyclohexyl methyl ether, ethylene glycol dimethyl ether, tetrahydrofuran, and dioxane); ester solvents (such as ethyl acetate and butyl acetate); nitrile solvents (such as acetonitrile); alcohol solvents (such as methanol, ethanol, and 2-propanol); and mixed solutions of two or more of these solvents, and include preferably the aliphatic hydrocarbon solvents, the aromatic hydrocarbon solvents, the halogenated aromatic hydrocarbon solvents, and the ester solvents, and more preferably include toluene, xylene, ethyl benzene, hexane, heptane, and ethyl acetate.

EXAMPLES

Hereinafter, the present invention is explained in more detail by the following Examples.

In an Example, the ratio of R-isomer/S-isomer was analyzed by a high performance liquid chromatography (area percentage) using chiral column. Each amount of the 1,1,3-trimethyl-4-aminoindane, and (R)-(−)—N-(1,2,3-trimethyl-indan-4-yl)-1-methyl-3-difluoromethylpyrazol-4-carboxylic acid amide was analyzed by a liquid chromatography (internal standard method).

Example 1

Synthesis of dibromo[2,6-bis[4-(S)-t-butyl-2-oxazolinyl]-pyridine]cobalt

In a 100 mL flask with a reflux condenser which was purged with nitrogen, 2,6-bis[4-(S)-t-butyl-2-oxazolinyl] pyridine 2.37 g and tetrahydrofuran 43 g were placed, and the mixture was stirred at 25° C. to confirm that 2,6-bis[4-(S)-t-butyl-2-oxazolinyl]pyridine was dissolved completely. To the resulting solution was added cobalt(II) bromide 1.31 g at 25° C. and the mixture was then warmed and heated under reflux for 2 hours. After the mixture was cooled to room temperature, solvents were distilled off from the resulting reaction mixture, and tetrahydrofuran 8 g was added thereto, and the mixture was made a slurry state, and methyl t-butyl ether 185 g was further added thereto, and the mixture was heated under reflux for 1 hour. The mixture was cooled to room temperature to precipitate out the crystals, and the obtained crystals were filtered, and the crystals were washed with methyl butyl ether 150 g, and then dried to obtain blue green powder 3.41 g. The obtained powders were confirmed by EI-MS to be dibromo [2,6-bis[4-(S)-t-butyl 2-oxazolinyl]pyridine]cobalt. Yields: 88%.

EI-MS=546, 548, and 550.

Example 2

Synthesis of dibromo[2,6-bis[4-(S)-isopropyl-2-oxazolinyl]pyridine]cobalt

The processes were carried out similarly to those of Example 1 except for the point that 2,6-bis[4-(S)-isopropyl-2-oxazolinyl]pyridine 2.16 g was used in place of 2,6-bis [4-(S)-t-butyl-2-oxazolinyl]pyridine 2.37 g to obtain blue green powder 3.17 g. Yields: 85%.

Example 3

Synthesis of 2,6-bis[4-(S)-t-butyl-2-oxazolinyl]-4-methoxypyridine]cobalt

The processes were carried out similarly to those of Example 1 except for the point that 2,6-bis[4-(S)-isobutyl-2-oxazolinyl]-4-methoxypyridine 2.59 g was used in place of 2,6-bis[4-(S)-t-butyl-2-oxazolinyl]pyridine 2.37 g to obtain blue green powder 3.54 g. Yields: 85%.

Example 4

Asymmetric hydrogenation reaction by dibromo[2,6-bis[4-(S)-t-butyl-2-oxazolinyl]pyridine]cobalt hydride reduction complex In 100 mL autoclave with a glass inner tube, dibromo [2,6-bis[4-(S)-t-butyl-2-oxazolinyl]pyridine]cobalt 88 mg and 1-acetyl-1,2-dihydro-2,2,4-trimethyl-1-quinoline 3.44 g, and tetrahydrofuran 11.5 g were placed. After nitrogen purging, the mixture was warmed to 35° C., and to the resulting mixture was added 1M triethyl sodium borohydride/tetrahydrofuran solution 0.64 mL, and the mixture was purged with hydrogen gas to pressurize to 0.95 MPa with hydrogen gas, and the mixture was stirred at 35° C. for 1 hour under pressure. After the reaction, the mixture was cooled to 15° C., and the mixture was then purged with nitrogen gas, and the ratio of R-isomer in the resulting reaction mixture and the yields of 1-acetyl-2,2,4-trimethyl-1,2,3,4-tetrahydroquinoline were analyzed by a high performance liquid chromatography. R-isomer ratio=82.5%, Yields=99%.

Example 5

Asymmetric hydrogenation reaction by dichloro[2,6-bis[4-(S)-t-butyl-2-oxazolinyl]pyridine]cobalt hydride reduction complex In 100 mL autoclave with a glass inner tube, dichloro [2,6-bis[4-(S)-t-butyl-2-oxazolinyl]pyridine]cobalt 74 mg, 1-acetyl-1,2-dihydro-2,2,4-trimethyl-1-quinoline 3.44 g, and tetrahydrofuran 11.5 g were placed. After nitrogen purging, the mixture was warmed to 35° C., and to the resulting mixture was added 1M triethyl sodium borohydride/tetrahydrofuran solution 0.64 mL, and the mixture was purged with hydrogen gas to pressurize to 0.95 MPa with hydrogen gas, and the mixture was stirred at 35° C. for 1 hour under pressure. After the reaction, the mixture was cooled to 15° C., and the mixture was then purged with nitrogen gas, and the ratio of R-isomer in the resulting reaction mixture and the yields of 1-acetyl-2,2,4-trimethyl-1,2,3,4-tetrahydroquinoline were analyzed by a high performance liquid chromatography. R-isomer ratio=70%, Yields=99%.

Example 6

Asymmetric hydrogenation reaction by dibromo[2, 6-bis [4-(S)-t-butyl-2-oxazolinyl]pyridine]cobalt hydride reduction complex In 100 mL autoclave with a glass inner tube, dibromo [2,6-bis[4-(S)-t-butyl-2-oxazolinyl]pyridine]cobalt 44 mg and 1-acetyl-1,2-dihydro-2,2,4-trimethyl-1-quinoline 6.89 g, cobalt(II) bromide 17.5 mg and tetrahydrofuran 11.5 g were placed. After nitrogen purging, the mixture was warmed to 40° C., and to the resulting mixture was added 1M triethyl sodium borohydride/tetrahydrofuran solution 0.8 mL, and the mixture was purged with hydrogen gas to pressurize to 0.95 MPa with hydrogen gas, and the mixture was stirred at 40° C. for 2 hours under pressure. After the reaction, the mixture was cooled to 15° C., and the mixture was then purged with nitrogen gas, and the ratio of R-isomer in the resulting reaction mixture and the yields of 1-acetyl-2,2,4-trimethyl-1,2,3,4-tetrahydroquinoline was analyzed by a high performance liquid chromatography. R-isomer ratio=75.0%, Yields=100%.

Example 7

Asymmetric hydrogenation reaction by dibromo[2, 6-bis [4-(S)-t-butyl-2-oxazolinyl]pyridine]cobalt hydride reduction complex The reaction were carried out similarly to those of Example 6 except for the point that cobalt(II) bromide was not added. After the reaction, the mixture was cooled to 15° C., and the mixture was then purged with nitrogen gas, and the R-isomer ratio in the resulting reaction mixture, and the yield of 1-acetyl-2,2,4-trimethyl-1,2,3,4-tetrahydroquinoline were analyzed by a high performance liquid chromatography. R-isomer ratio=58.0%, Yields=85%.

Example 8

Asymmetric hydrogenation reaction by dibromo[2, 6-bis [4-(S)-t-butyl-2-oxazolinyl]pyridine]cobalt hydride reduction complex In 100 mL autoclave with a glass inner tube, dibromo [2,6-bis[4-(S)-t-butyl-2-oxazolinyl]pyridine]cobalt 88 mg and 1-acetyl-1,2-dihydro-2,2,4-trimethyl-1-quinoline 6.89 g, cobalt(II) bromide 35 mg and tetrahydrofuran 11.5 g were placed. After nitrogen purging, the mixture was warmed to 40° C., and to the resulting mixture was added 1M triethyl sodium borohydride/tetrahydrofuran solution 1.6 mL, and the mixture was purged with hydrogen gas to pressurize to 0.95 MPa with hydrogen gas, and the mixture was stirred at 40° C. for 2 hours under pressure. After the reaction, the mixture was cooled to 15° C., and the mixture was then purged with nitrogen gas, and the ratio of R-isomer in the resulting reaction mixture and the yields of 1-acetyl-2,2,4-trimethyl-1,2,3,4-tetrahydroquinoline was analyzed by a high performance liquid chromatography. R-isomer ratio=72.5%, Yields=100%.

Example 9

Asymmetric hydrogenation reaction by dibromo[2, 6-bis [4-(S)-t-butyl-2-oxazolinyl]pyridine]cobalt hydride reduction complex In 100 mL autoclave with a glass inner tube, dibromo [2,6-bis[4-(S)-t-butyl-2-oxazolinyl]pyridine]cobalt 44 mg and 1-acetyl-1,2-dihydro-2,2,4-trimethyl-1-quinoline 6.89 g, triethylamine 3.85 g, and 1,4-dioxane 8.2 g were placed. After nitrogen purging, the mixture was warmed to 40° C., and to the resulting mixture was added 1M triethyl sodium borohydride/tetrahydrofuran solution 0.64 mL, and the mixture was stirred at 40° C. for 1 hour while keeping the temperature. After 1 hour, the reaction solution was cooled to 15° C., and the mixture was then purged with hydrogen gas to pressurize to 0.95 MPa with hydrogen gas, and the mixture was stirred at 15° C. for 5 hours under pressure. After the reaction, the mixture was purged with nitrogen gas, and the R-isomer ratio in the resulting reaction mixture, and the yields of 1-acetyl-2,2,4-trimethyl-1,2,3,4-tetrahydroquinoline were analyzed by a high performance liquid chromatography. R-isomer ratio=90.0%, and Yields=100%.

Example 10

Asymmetric hydrogenation reaction by dibromo[2, 6-bis[4-(S)-t-butyl-2-oxazolinyl]pyridine]cobalt hydride reduction complex In 100 mL autoclave with a glass inner tube, dibromo [2,6-bis[4-(S)-t-butyl-2-oxazolinyl]pyridine]cobalt 22 mg and 1-acetyl-1,2-dihydro-2,2,4-trimethyl-1-quinoline 3.44 g, triethylamine 1.93 g, and 1,4-dioxane 4.1 g were placed. After nitrogen purging, the mixture was warmed to 40° C., and to the resulting mixture was added 1M triethyl sodium borohydride/tetrahydrofuran solution 0.4 mL, and the mixture was stirred at 40° C. for 1 hour while keeping the temperature. After 1 hour, the reaction solution was cooled to 25° C., and the mixture was then purged with hydrogen gas to pressurize to 0.95 MPa with hydrogen gas, and the mixture was stirred at 25° C. for 3 hours under pressure. After the reaction, the mixture was purged with nitrogen gas, and the R-isomer ratio in the resulting reaction mixture, and the yields of 1-acetyl-2,2,4-trimethyl-1,2,3,4-tetrahydroquinoline were analyzed by a high performance liquid chromatography. R-isomer ratio=86.5%, and Yields=99%.

Example 11

Asymmetric hydrogenation reaction by dibromo[2, 6-bis [4-(S)-t-butyl-2-oxazolinyl]pyridine]cobalt hydride reduction complex In 100 mL autoclave with a glass inner tube, dibromo [2,6-bis[4-(S)-t-butyl-2-oxazolinyl]pyridine]cobalt 88 mg and 1-acetyl-1,2-dihydro-2,2,4-trimethyl-1-quinoline 13.8 g, cobalt(II) bromide 35 mg, and 1,4-dioxane 16.5 g were placed. After nitrogen purging, the mixture was warmed to 40° C., and to the resulting mixture was added 1M triethyl sodium borohydride/tetrahydrofuran solution 1.2 mL, and the mixture was stirred at 40° C. for 1 hour while keeping the temperature. After 1 hour, the reaction solution was cooled to 25° C., and the mixture was then purged with hydrogen gas to pressurize to 0.95 MPa with hydrogen gas, and the mixture was stirred at 25° C. for 4 hours under pressure. After the reaction, the mixture was purged with nitrogen gas, and the R-isomer ratio in the resulting reaction mixture, and the yields of 1-acetyl-2,2,4-trimethyl-1,2,3,4-tetrahydroquinoline were analyzed by a high performance liquid chromatography. R-isomer ratio=86.0%, and Yields=100%.

Example 12

Asymmetric hydrogenation reaction by dibromo[2,6-bis [4-(S)-t-butyl-2-oxazolinyl]pyridine]cobalt hydride reduction complex In 100 mL autoclave with a glass inner tube, dibromo [2,6-bis[4-(S)-t-butyl-2-oxazolinyl]pyridine]cobalt 44 mg and 1-acetyl-1,2-dihydro-2,2,4-trimethyl-1-quinoline 6.89 g, and 1,4-dioxane 8.2 g were placed. After nitrogen purging, the mixture was warmed to 40° C., and to the resulting mixture was added 1M triethyl sodium borohydride/tetrahydrofuran solution 0.6 mL, and the mixture was stirred at 40° C. for 1 hour while keeping the temperature. After 1 hour, the reaction solution was cooled to 25° C., and the mixture was then purged with hydrogen gas to pressurize to 0.95 MPa with hydrogen gas, and the mixture was stirred at 25° C. for 4 hours under pressure. After the reaction, the mixture was purged with nitrogen gas, and the R-isomer ratio in the resulting reaction mixture, and the yields of 1-acetyl-2,2,4-trimethyl-1,2,3,4-tetrahydroquinoline were analyzed by a high performance liquid chromatography. R-isomer ratio=83.6%, and Yields=100%.

Example 13

Asymmetric hydrogenation reaction by dibromo[2,6-bis [4-(S)-t-butyl-2-oxazolinyl]pyridine]cobalt hydride reduction complex In 100 mL autoclave with a glass inner tube, dibromo [2,6-bis[4-(S)-t-butyl-2-oxazolinyl]pyridine]cobalt 44 mg and 1-acetyl-1,2-dihydro-2,2,4-trimethyl-1-quinoline 7.5 g, and 1,4-dioxane 8.2 g were placed. After nitrogen purging, the mixture was warmed to 40° C., and to the resulting mixture was added 1M triethyl sodium borohydride/tetrahydrofuran solution 0.6 mL, and the mixture was stirred at 40° C. for 1 hour while keeping the temperature. After 1 hour, the reaction solution was cooled to 25° C., and the mixture was then purged with hydrogen gas to pressurize to 0.95 MPa with hydrogen gas, and the mixture was stirred at 25° C. for 4 hours under pressure. After the reaction, the mixture was purged with nitrogen gas, and the R-isomer ratio in the resulting reaction mixture, and the yields of 1-acetyl-2,2,4-trimethyl-1,2,3,4-tetrahydroquinoline were analyzed by a high performance liquid chromatography. R-isomer ratio=84%, and Yields=91%.

Example 14

<Asymmetric Hydrogenation Reaction by dibromo[2,6-bis [4-(S)-isopropyl-2-oxazolinyl]pyridine]cobalt Hydride Reduction complex>

In 100 mL autoclave with a glass inner tube, dibromo [2,6-bis[4-(S)-isopropyl-2-oxazolinyl]pyridine]cobalt which was prepared in Example 2 52 mg, 1-acetyl-1,2-dihydro-2,2,4-trimethyl-1-quinoline 4.31 g, triethylamine 2.6 g, and 1,4-dioxane 10.1 g were placed. After nitrogen purging, the mixture was warmed to 40° C., and to the resulting mixture was added 1M triethyl sodium borohydride/toluene solution 0.8 mL, and the mixture was stirred at 40° C. for 1 hour while keeping the temperature. After 1 hour, the reaction solution was cooled to 25° C., and the mixture was then purged with hydrogen gas to pressurize to 0.95 MPa with hydrogen gas, and the mixture was stirred at 25° C. for 3 hours under pressure. After the reaction, the mixture was purged with nitrogen gas, and the R-isomer ratio in the resulting reaction mixture, and the yields of 1-acetyl-2,2,4-trimethyl-1,2,3,4-tetrahydroquinoline were analyzed by a high performance liquid chromatography. R-isomer ratio=66.3%, and Yields=65%.

Example 15

Asymmetric hydrogenation reaction by dibromo[2,6-bis [4-(S)-t-butyl-2-oxazolinyl]-4-methoxypyridine]cobalt hydride reduction complex In 100 mL autoclave with a glass inner tube, dibromo [2,6-bis [4-(S)-t-butyl-2-oxazolinyl]-, -methoxy-pyridine] cobalt which was prepared in Example 3 58 mg, 1-acetyl-1,2-dihydro-2,2,4-trimethyl-1-quinoline 4.31 g, triethylamine 2.6 g, and 1,4-dioxane 10.1 g were placed. After nitrogen purging, the mixture was warmed to 40° C., and to the resulting mixture was added 1M triethyl sodium borohydride/tetrahydrofuran solution 0.8 mL, and the mixture was stirred at 40° C. for 1 hour while keeping the temperature. After 1 hour, the reaction solution was cooled to 25° C., and the mixture was then purged with hydrogen gas to pressurize to 0.95 MPa with hydrogen gas, and the mixture was stirred at 25° C. for 3 hours under pressure. After the reaction, the mixture was purged with nitrogen gas, and the R-isomer ratio in the resulting reaction mixture, and the yields of 1-acetyl-2,2,4-trimethyl-1,2,3,4-tetrahydroquinoline were analyzed by a high performance liquid chromatography. R-isomer ratio=78.6%, and Yields=100%.

Example 16

Asymmetric hydrogenation reaction by dibromo[2,6-bis [4-(S)-t-butyl-2-oxazolinyl]pyridine]cobalt methyl reduction complex To a Schlenk tube under nitrogen atmosphere, dibromo [2,6-bis[4-(S)-t-butyl-2-oxazolinyl]pyridine]cobalt 219 mg, 1,4-dioxane 2 g, and toluene 2 g were added, and the mixture was cooled to −40° C. To this mixture solution, 1.1 M methyl lithium/diethyl ether solution 2 mL was added, and the mixture was continued to stir for 3 hours until it reached room temperature, and the methyl complex was prepared.

In 100 mL autoclave with a glass inner tube, 1-acetyl-1,2-dihydro-2,2,4-trimethyl-1-quinoline 8.61 g, 1,4-dioxane 10 g, and triethylamine 4.9 g were placed. After nitrogen purging, at 25° C. to the mixture, the methyl complex solution that was prepared in the above Schenk tube was added in whole amounts thereof. The mixture was purged with hydrogen gas, and the mixture was then purged with hydrogen gas to pressurize to 0.95 MPa with hydrogen gas, and the mixture was stirred at 25° C. for 4 hours under pressure. After the reaction, the mixture was purged with nitrogen gas, and the R-isomer ratio in the resulting reaction mixture, and the yields of 1-acetyl-2,2,4-trimethyl-1,2,3,4-tetrahydroquinoline were analyzed by a high performance liquid chromatography. R-isomer ratio=54.6%, and Yields=32%.

Example 17

Synthesis of optically active 1,1,3-trimethyl-4-aminoindane

In a 300 mL flask purged with nitrogen gas, 50 g of a solution of the 1-acetyl-2,2,4-trimethyl-1,2,3,4-tetrahydroquinoline having 77.7% of the R-isomer ratio, which was obtained similarly to the Example 4 or Example 6, in tetrahydrofuran was placed, and tetrahydrofuran was distilled off from the resulting mixture. The flask in which the concentrated solution 13.3 g (content amounts 85%) was remained was purged with a nitrogen gas, and 98% sulfuric acid 22.7 g and water 260 mg were placed in the flask at room temperature, and the mixture was heated with stirring at 45° C. for 6 hours. After the reaction, water 23 g was added to the mixture, and the mixture was further heated at 110° C. for 2 hours with stirring. After the completion of the reaction, 27% aqueous sodium hydroxide solution 85 g was added to the reaction solution, and the mixture was extracted with toluene 50 g twice. The toluene layers were combined, and the mixture was washed with water 10 g once, and the toluene was then distilled off. The resulting concentrated solution was the optically active 1,1,3-trimethyl-4-aminoindane, which yielded 9.6 g. An analysis method of content amounts using an internal standard method by liquid chromatography, and an optical purity analysis were carried out to calculate the content amounts and the optical purity. Content amounts 90%, Optical isomer ratio R:S=78.1:21.9%, Yields=95%.

Example 18

Optical resolution of 1,1,3-trimethyl-4-aminoindane using d-tartaric acid

In a 300 mL flask purged with nitrogen gas, 1,1,3-trimethyl-4-aminoindane (R-isomer/S-isomer=78/22), which was obtained in Example 17, 9.6 g, and methanol 36 g were placed, and the mixture was warmed to 60° C. D-tartaric acid 7.4 g was dissolved in water 20 g to prepare a solution, and the solution was added dropwise thereto at 60° C. over 30 minutes. After cooling the reaction mixture to 38° C., (R)-1,1,3-trimethyl-4-aminoindane·d-tartaric acid salt 20 mg was added thereto to precipitate out a crystal, and the mixture was cooled to 10° C. over 3 hours. This reaction solution was filtered with a Buchner funnel (that is, Nutsche) under reduced pressure, and the obtained crystals were further washed with toluene 10 g twice on the Buchner funnel under reduced pressure to remove the solvent. This crystal was dried to obtain (R)-1,1,3-trimethyl-4-aminoindane·d-tartaric acid methanol solvate salt 11.4 g. The optical purity analysis was carried out by a liquid chromatography to calculate the optical purity of (R)-1,1,3-trimethyl-4-aminoindane. Optical isomer ratio R:S=98.1:1.9, Yields=65%.

Example 19

Synthesis of optically active 1,1,3-trimethyl-4-aminoindane

In a 300 mL flask purged with nitrogen gas, 53 g of a solution of 1-acetyl-2,2,4-trimethyl-1,2,3,4-tetrahydroquinoline (R-isomer/S-isomer=80.7/19.3), which was obtained similarly to Example 4 or Example 6, in tetrahydrofuran was placed, and tetrahydrofuran was distilled off. The flask in which the concentrated solution 15.8 g (content amounts 85%) was remained was purged with a nitrogen gas, and 98% sulfuric acid 26.9 g and water 180 mg were placed in the flask at room temperature, and the mixture was heated with stirring at 45° C. for 7 hours. After the reaction, water 27.3 g was added to the mixture, and the mixture was further heated at 110° C. for 2 hours with stirring. After the completion of the reaction, 27% aqueous sodium hydroxide solution 100 g was added to the reaction solution, and the mixture was extracted with toluene 60 g twice. The toluene layers were combined, and the mixture was washed with water 12 g once, and the toluene was then distilled off. The resulting concentrated solution was the optically active 1,1,3-trimethyl-4-aminoindane, which yielded 12.1 g. An analysis method of content amounts using an internal standard method by liquid chromatography, and an optical purity analysis were carried out to calculate the content amounts and the optical purity. Content amounts 90%, Optical isomer ratio R:S=80.7:19.3%, Yields=98%.

Example 20

Optical resolution of 1,1,3-trimethyl-4-aminoindane using d-tartaric acid

In a 300 mL flask purged with nitrogen gas, 1,1,3-trimethyl-4-aminoindane (R-isomer/S-isomer=80.7/19.3), which was obtained in Example 19, 12 g, and methanol 46 g were placed, and the mixture was warmed to 60° C. D-tartaric acid 9.8 g was dissolved in water 23 g to prepare a solution, and the solution was added dropwise thereto at 60° C. over 30 minutes. After cooling the reaction mixture to 40° C., (R)-1,1,3-trimethyl-4-aminoindane·d-tartaric acid salt 20 mg was added thereto to precipitate out a crystal, and the mixture was cooled to 10° C. over 3 hours. This reaction solution was filtered with a Buchner funnel (that is, Nutsche) under reduced pressure, and the obtained crystals were further washed with toluene 10 g twice on the Buchner funnel under reduced pressure to remove the solvent. This crystal was dried to obtain (R)-1,1,3-trimethyl-4-aminoindane·d-tartaric acid methanol solvate salt 12.5 g. The optical purity analysis was carried out by a liquid chromatography to calculate the optical purity. Optical isomer ratio R:S=98.1:1.9, Yields=70.6%.

Example 21

<First Step of the Preferential Crystallization Using Sodium Hydrogen Sulfate (pKa=1.99))

In a 300 mL flask purged with nitrogen gas, 1,1,3-trimethyl-4-aminoindane (R-isomer/S-isomer=83/17) 17.5 g, and methanol 60 g were placed, and the mixture was warmed to 60° C. Sodium hydrogen sulfate·monohydrate 9.6 g was dissolved in water 15 g to prepare a solution, and the solution was added dropwise thereto at 60° C. over 30 minutes to precipitate out a crystal. After keeping the reaction solution at 60° C. for 3 hours, the mixture was cooled to room temperature over 3 hours, and further cooled to 10° C. over 1 hour. This reaction solution was filtered with a Buchner funnel (that is, Nutsche) under reduced pressure, and the obtained crystals were further washed with toluene 15 g twice on the Buchner funnel under reduced pressure to remove the solvent. This crystal was dried to obtain (R)-1,1,3-trimethyl-4-aminoindane·sodium hydrogen sulfate salt 19.3 g. The optical purity analysis was carried out by a liquid chromatography to calculate the optical purity. Optical isomer ratio R:S=96.4:3.6, Yields=66%.

Example 22

Second Step of Preferential Crystallization

In a 100 mL flask purged with nitrogen gas, (R)-1,1,3-trimethyl-4-aminoindane·sodium hydrogen sulfate salt, which was obtained in Example 21, 19 g, 27% aqueous sodium hydroxide solution 14.2 g, and toluene 40 g were placed. The mixture was stirred at room temperature for 30 minutes. The toluene layer was washed with water 5 g once, and toluene was then distilled off to obtain (R)-1,1,3-trimethyl-4-aminoindane 11.2 g. An analysis method of content amounts using an internal standard method by liquid chromatography, and an optical purity analysis were carried out to calculate the content amounts and the optical purity. Optical isomer ratio R:S=96.4:3.6%, Content amounts 98%, Yields=98%.

Example 23

<First Step of the Preferential Crystallization Using Sodium Hydrogen Sulfate (pKa=1.99))

In a 300 mL flask purged with nitrogen gas, 1,1,3-trimethyl-4-aminoindane (R-isomer/S-isomer=83/17) 17.5 g, and methanol 60 g were placed, and the mixture was warmed to 60° C. Sodium hydrogen sulfate·monohydrate 9.3 g was dissolved in water 20 g to prepare a solution, and the solution was added dropwise thereto at 60° C. over 30 minutes to precipitate out a crystal. After keeping the reaction solution at 70° C. for 3 hours, the mixture was cooled to room temperature over 3 hours, and further cooled to 10° C. over 1 hour. This reaction solution was filtered with a Buchner funnel (that is, Nutsche) under reduced pressure, and the obtained crystals were further washed with toluene 15 g twice on the Buchner funnel under reduced pressure to remove the solvent. This crystal was dried to obtain (R)-1,1,3-trimethyl-4-aminoindane·sodium hydrogen sulfate salt 19.6 g. The optical purity analysis was carried out by a liquid chromatography to calculate the optical purity. Optical isomer ratio R:S=96.8:3.2, Yields=66.5%.

Example 24

<First Step of the Preferential Crystallization Using Sodium Hydrogen Sulfate (pKa=1.99))

In a 300 mL flask purged with nitrogen gas, 1,1,3-trimethyl-4-aminoindane (R-isomer/S-isomer=90/10) 17.5 g, and methanol 60 g were placed, and the mixture was warmed to 60° C. Sodium hydrogen sulfate monohydrate 11.5 g was dissolved in water 18 g to prepare a solution, and the solution was added dropwise thereto at 60° C. over 30 minutes to precipitate out a crystal. After keeping the reaction solution at 60° C. for 2 hours, the mixture was cooled to room temperature over 3 hours, and further cooled to 10° C. over 1 hour. This reaction solution was filtered with a Buchner funnel (that is, Nutsche) under reduced pressure, and the obtained crystals were further washed with toluene 15 g twice on the Buchner funnel under reduced pressure to remove the solvent. This crystal was dried to obtain (R)-1,1,3-trimethyl-4-aminoindane·sodium hydrogen sulfate salt 23.5 g. The optical purity analysis was carried out by a liquid chromatography to calculate the optical purity. Optical isomer ratio R:S=98.4:1.6, Yields=80%.

Example 25

Synthesis of (R)-1,1,3-trimethyl-4-aminondane by decomposing (R)-1,1,3-trimethyl-4-aminoindane • d-Tartaric Acid Methanol Solvate Salt In a 100 mL purged with nitrogen gas, (R)-1,1,3-trimethyl-4-aminoindane·d-tartaric acid methanol solvate salt, which was obtained in Example 18, 5 g, 27% aqueous sodium hydroxide solution 5.2 g, and toluene 10 g were placed. The mixture was stirred at room temperature for 30 minutes. The toluene layer was washed with water 5 g once, and toluene was then distilled off to obtain (R)-1,1,3-trimethyl-4-aminoindane 2.4 g. An analysis method of content amounts using an internal standard method by liquid chromatography, and an optical purity analysis were carried out to calculate the content amounts and the optical purity. Optical isomer ratio R:S=98.1:1.9%, Content amounts 98%, Yields=98%.

Example 26

<Amidation Reaction D>

Under nitrogen atmosphere, at room temperature, 1-methyl-3-difluoromethyl-pyrazol-4-carboxylic acid 14.0 parts and xylene 35.1 parts were mixed. The resulting mixture was heated at 100° C. To the resulting mixture was added dropwise thionyl chloride 11.2 parts over 5 hours. The resulting mixture was stirred at 100° C. for 15 hours, and then cooled to 40° C. Thionyl chloride and xylene were distilled off from the resulting mixture under reduced pressure to obtain brown 1-methyl-3-difluoromethyl-pyrazol-4-carboxylic acid chloride.

(R)-1,1,3-trimethyl-4-aminoindane 14.6 parts, triethyl amine 9.2 parts, and xylene 38.1 parts were mixed to prepare a solution. To the resulting solution, a solution obtained by dissolving 1-methyl-difluoromethyl-pyrazol-4-carboxylic acid chloride in xylene 13.2 parts was added dropwise at 45° C. to 50° C. over 2 hours. The resulting mixture was stirred at 45° C. to 50° C. for 15 hours. The resulting reaction mixture and aqueous 20% sodium hydroxide solution were mixed, and the organic layer was then separated. The resulting organic layer was washed with water, 18% hydrochloric acid, water, aqueous 1% sodium hydroxide solution, and water continuously, and concentrated under reduced pressure to obtain (R)-(−)—N-(1,1,3-trimethyl-indan-4-yl)-1-methyl-3-diflurormethyl-pyrazol-4-carboxylic acid amide 27.5 parts.

Example 27

<Amidation Reaction D>

Under nitrogen atmosphere, at room temperature, 1-methyl-3-difluoromethyl-pyrazol-4-carboxylic acid 1.8 g and toluene 10 g were mixed. The resulting mixture was heated at 100° C. To the resulting mixture was added dimethyl formamide 30 mg, and then a mixture solution obtained by dissolving thionyl chloride 1.57 g in toluene 5 g was added dropwise over 30 minutes. The resulting mixture was stirred at 100° C. for 2 hours, and then cooled to 40° C. Thionyl chloride and toluene were distilled off from the resulting mixture under reduced pressure to obtain brown 1-methyl-3-difluoromethyl-pyrazol-4-carboxylic acid chloride.

A whole amount of this brown 1-methyl-3-difluoromethyl-pyrazol-4-carboxylic acid chloride, (R)-1,1,3-trimethyl-4-aminoindane·sodium hydrogen sulfate salt, which was obtained in Example 23, 3 g, and toluene 10 g were mixed, and the mixture was warmed at 50° C. To this solution was added dropwise a mixed solution of triethyl amine 2.26 g and toluene 5 g over 30 minutes, and the mixture was stirred for 2 hours while keeping the temperature. After the resulting reaction mixture and water were mixed, the organic layer was then separated. The resulting organic layer was washed with water three times, and then concentrated under reduced pressure to (R)-(−)—N-(1,1,3-trimethyl-indane-4-yl)-1-methyl-3-difluoromethylpyrazol-4-carboxylic acid amide 3.3 g.

INDUSTRIAL APPLICABILITY

According to the present invention, the optically active (R)-1,1,3-trimethyl-4-aminoindane can be prepared effectively. Such a compound is useful as a process intermediate for preparing (R)-(−)-(1,1,3-trimethyl-indan-4-yl)-1-methyl-3-difluoromethylpyrazol-4-carboxylic acid amide showing an effect on preventing plant diseases. Also the present invention provides an asymmetric cobalt complex which can be used in a preparation of a precursor of the intermediate compound.

The invention claimed is:

1. A process for preparing an optically active compound represented by formula (3):

(3)

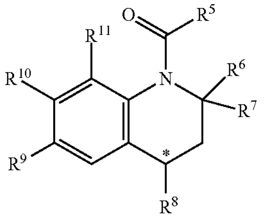

wherein $R^5$ represents a hydrogen atom, or a C1-C6 alkyl group which may optionally have one or more substituents;

$R^6$ and $R^7$ each independently represents a hydrogen atom, or a C1-C6 alkyl group;

$R^8$ represents a C1-C6 alkyl group; and $R^9$, $R^{10}$ and $R^{11}$ each independently represents a hydrogen atom, a halogen atom, an amino group, a hydroxy group, a C1-C6 alkyl group which may optionally have one or more substituents, a C1-C6 alkoxy group which may optionally have one or more substituents, a C2-C7 alkylcarbonyl group which may optionally have one or more substituents, or a C6-C10 aryl group which may optionally have one or more substituents; and the carbon atom with a symbol of the asterisked "*" represents an asymmetric carbon atom, which comprises reacting a compound represented by formula (2):

(2)

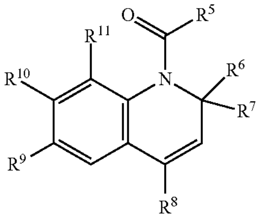

wherein each of $R^5$, $R^6$, $R^7$, $R^8$, $R^9$, $R^{10}$, and $R^{11}$ has the same meanings as described above with hydrogen in the presence of an asymmetric cobalt complex which is a monovalent asymmetric cobalt complex which is obtained by reacting an asymmetric cobalt complex represented by formula (1) with a reducing agent:

(1)

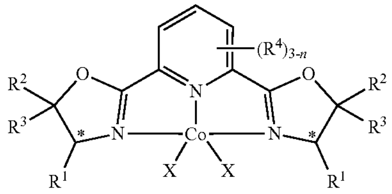

where, $R^1$ each independently represents a C1-C10 alkyl group which may optionally have one or more substituents, a C3-C10 cycloalkyl group which may optionally have one or more substituents, or a C6-C10 aryl group which may optionally have one or more substituents;

$R^2$ and $R^3$ each independently represents a hydrogen atom, a C1-C10 alkyl group which may optionally have one or more substituents, or a C6-C10 aryl group which may optionally have one or more substituents, or alternatively $R^2$ and $R^3$ are combined with each other together with a carbon atom to which they are attached to form a cycle;

$R^4$ represents a C1-C10 alkyl group which may optionally have one or more substituents, a C1-C10 alkoxy group which may optionally have one or more substituents, a C1-C10 alkylthio group which may optionally have one or more substituents, a C2-C11 alkoxycarbonyl group which may optionally have one or more substituents, a C2-C11 alkylcarbonyl group which may optionally have one or more substituents, a C6-C10 aryl group which may optionally have one or more substituents, a halogen atom, an amino group which may be optionally mono- or di-alkylated with C1-C10 alkyl group, a nitro group, a hydroxy group, a sulfo group, a C1-10 alkylsulfonyl group, a C6-C10 arylsulfonyl group, or a halosulfonyl group;

n is 0, 1, 2 or 3:

when n is 0 or 1, a plurality of $R^4$ may be identical to or different from each other;

X represents a chlorine atom, a bromine atom or an iodine atom; and the carbon atom with a symbol of the asterisked "*" represents an asymmetric carbon atom.

2. The process according to claim 1, wherein the reducing agent represents a hydride reducing agent, and the monovalent asymmetric cobalt complex represents a hydride complex.

3. The process according to claim 2 wherein the hydride reducing agent represents a trialkyl borohydride alkali metal salt.

4. A process according to claim 2 wherein the reaction of the compound of formula (2) with hydrogen is carried out further in the presence of a divalent halogenated cobalt salt.

5. The process according to claim 4 wherein an amount used of the divalent halogenated cobalt salt per 1 mole of the hydride complex is within a range of 2 moles or less.

6. The process according to claim 2 wherein the reaction of the compound of formula (2) with hydrogen is carried out further in the presence of trialkylamine.

7. The process according to claim 6 wherein an amount used of the trialkylamine per 1 mole of the compound represented by formula (2) is within a range of 0.5 moles to 3 moles.

8. The process according to claim 1, wherein the reducing agent represents an alkyl lithium, and the monovalent cobalt complex represents an alkyl complex.

9. A process for preparing an optically active compound, which comprises obtaining an optically active compound represented by formula (3) by the process according to claim 1;

reacting the optically active compound represented by formula (3) with an acid to obtain an optically active compound represented by formula (4):

(4)

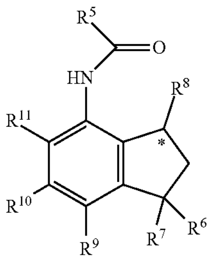

wherein each of $R^5$, $R^6$, $R^7$, $R^8$, $R^9$, $R^{10}$, and $R^{11}$ has the same meanings as described above; and the carbon atom with a symbol of the asterisked "*" represents an asymmetric carbon atom; and reacting the obtained optically active compound represented by formula (4) with water to obtain an optically active compound represented by formula (5):

(5)

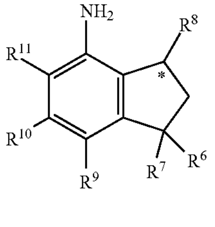

wherein each of $R^6$, $R^7$, $R^8$, $R^9$, $R^{10}$, and $R^{11}$ has the same meanings as described above; and the carbon atom with a symbol of the asterisked "*" represents an asymmetric carbon atom.

10. The process according to claim 9 wherein $R^6$, $R^7$ and $R^8$ in the formula (5) represents a methyl group; and $R^9$, $R^{10}$ and $R^{11}$ represents a hydrogen atom.

11. A process for preparing an optically active 1,1,3-trimethyl-4-aminoindane, which comprises obtaining an optically active 1,1,3-trimethyl-4-aminoindane by the process according to claim 10;

dissolving the optically active 1,1,3-trimethyl-4-aminoindane in a solvent to form a solution; and optically resolving the solution using an optically active tartaric acid.

12. A process for preparing an optically active 1,1,3-trimethyl-4-aminoindane, which comprises obtaining an optically active 1,1,3-trimethyl-4-aminoindane by the process according to claim 10;

dissolving the optically active 1,1,3-trimethyl-4-aminoindane in a solvent to form a solution; and carrying out a preferential crystallization by adding an acid to the solution.

13. The process according to claim 12 wherein an acid dissociation constant (pKa) of the acid is less than 2.8.

14. The process according to claim 11 wherein an enantiomeric ratio of the optically active 1,1,3-trimethyl-4-aminoindane which is supplied to the optical resolution is 70/30 or more as R-isomer/S-isomer.

15. A process for preparing an optically active compound, which comprises obtaining an optically active 1,1,3-trimethyl-4-aminoindane by the process according to claim 11;

reacting the optically active 1,1,3-trimethyl-4-aminoindane with a compound represented by formula (6):

(6)

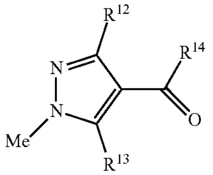

wherein $R^{12}$ and $R^{13}$ each independently represents a C1-C6 alkyl group which may be optionally substituted with one or more halogen atoms, or a hydrogen atom; and $R^{14}$ represents a halogen atom, a hydroxy group, or a C1-C6 alkoxy group which may be optionally substituted with one or more halogen atoms to obtain a compound represented by formula (7):

(7)

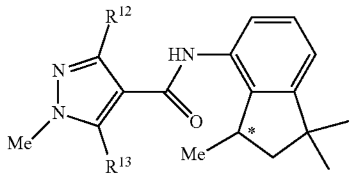

wherein each of $R^{12}$, $R^{13}$ and a symbol of the asterisked "*" has the same meanings as described above.

* * * * *